United States Patent
Wong et al.

(10) Patent No.: US 12,232,104 B2
(45) Date of Patent: Feb. 18, 2025

(54) COMMUNICATIONS DEVICE, INFRASTRUCTURE EQUIPMENT AND METHODS

(71) Applicant: Sony Group Corporation, Tokyo (JP)

(72) Inventors: Shin Horng Wong, Basingstoke (GB); Yassin Aden Awad, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 493 days.

(21) Appl. No.: 17/420,723

(22) PCT Filed: Jan. 8, 2020

(86) PCT No.: PCT/EP2020/050297
§ 371 (c)(1),
(2) Date: Jul. 6, 2021

(87) PCT Pub. No.: WO2020/148122
PCT Pub. Date: Jul. 23, 2020

(65) Prior Publication Data
US 2022/0070896 A1 Mar. 3, 2022

(30) Foreign Application Priority Data

Jan. 18, 2019 (EP) .................................... 19152670

(51) Int. Cl.
*H04W 72/1268* (2023.01)
*H04W 72/21* (2023.01)
(Continued)

(52) U.S. Cl.
CPC ....... *H04W 72/1268* (2013.01); *H04W 72/21* (2023.01); *H04W 72/23* (2023.01); *H04W 72/569* (2023.01)

(58) Field of Classification Search
CPC . H04W 72/1268; H04W 72/21; H04W 72/23; H04W 72/569; H04W 72/56
See application file for complete search history.

(56) References Cited

U.S. PATENT DOCUMENTS 9,781,744 B1 * 10/2017 Tenny ................... H04W 72/12
2016/0227560 A1 8/2016 Webb
(Continued)

FOREIGN PATENT DOCUMENTS

CN 107926037 A 4/2018
CN 108207032 A 6/2018
(Continued)

OTHER PUBLICATIONS

International Search Report and Written Opinion mailed on Mar. 9, 2020, received for PCT Application PCT/EP2020/050297, Filed on Jan. 8, 2020, 11 pages.
(Continued)

*Primary Examiner* — Christine Ng
(74) *Attorney, Agent, or Firm* — XSENSUS LLP

(57) ABSTRACT

A method of transmitting data by a communications device in a wireless communications network, the method comprising receiving a first downlink control message comprising an indication of a first dynamic grant allocating first uplink communications resources for transmission of data by the communications device, receiving a second downlink control message, the second downlink control message comprising an indication of a second dynamic grant allocating second uplink communications resources for transmission of data by the communications device, determining that the second uplink communications resources comprise at least a portion of the first uplink communications resources, determining that the first uplink communications resources are associated with a higher priority than the second uplink communications resources, and in response to
(Continued)

the determining that the first uplink communications resources are associated with a higher priority than the second uplink communications resources, transmitting a transport block using the first uplink communications resources.

19 Claims, 11 Drawing Sheets

(51) Int. Cl.
*H04W 72/23* (2023.01)
*H04W 72/566* (2023.01)

(56) References Cited

U.S. PATENT DOCUMENTS

| | | | |
|---|---|---|---|
| 2017/0034850 | A1* | 2/2017 | Rico Alvarino ........ H04L 43/16 |
| 2018/0176937 | A1* | 6/2018 | Chen .................... H04W 72/21 |
| 2018/0368157 | A1 | 12/2018 | Jeon et al. |
| 2019/0327639 | A1* | 10/2019 | Huang .................... H04L 1/189 |
| 2020/0059925 | A1* | 2/2020 | Lee .................... H04W 28/0278 |
| 2020/0146045 | A1* | 5/2020 | Loehr .................... H04L 1/1812 |
| 2020/0374933 | A1* | 11/2020 | Lou .................... H04W 74/0808 |
| 2020/0404669 | A1* | 12/2020 | Seo .................... H04L 25/0238 |

FOREIGN PATENT DOCUMENTS

| | | |
|---|---|---|
| EP | 2661138 A1 | 11/2013 |
| WO | WO-2017010477 A1 | 1/2017 |
| WO | 2020/020815 A1 | 1/2020 |
| WO | 2020/127529 A1 | 6/2020 |

OTHER PUBLICATIONS

LG Electronics "Intra-UE Prioritization for NR URLLC", 3GPP TSG RAN WG1 Ad-Hoc Meeting 1901, R1-1900597, XP51576139, Jan. 21-25, 2019, 3 pages.

Ericsson, "Enhancements for Intra-UE UL Prioritization and Multiplexing", 3GPP TSG RAN WG1 Ad-Hoc Meeting 1901, Tdoc R1-1900162, XP51575784, Jan. 21-25, 2019, 3 pages.

Ericsson, "On the Prioritized Scenarios of Intra-UE Prioritization and Multiplexing", 3GPP TSG RAN WG1 Ad-Hoc Meeting 1901, Tdoc R1-1900182, XP51575802, Jan. 21-25, 2019, 5 pages.

3GPP, "Study on Physical Layer Enhancements for NR Ultra-Reliable and Low Latency Case (URLLC) (Release 16)" 3GPP TR 38.824 V1.0.0, Nov. 2018, pp. 1-22.

3GPP, "LS on Intra-UE Prioritization/Multiplexing", 3GPP TSG-RAN WG2 Meeting #104, R1-1818795, Nov. 12-16, 2018, 2 pages.

Holma et al., "LTE for UMTS OFDMA and SC-FDMA Based Radio Access", John Wiley and Sons, 2009, pp. 25-27.

3GPP, "NR; NR and NG-RAN Overall Description; Stage 2 (Release 15)" 3GPP TS 38.300 V15.2.0, Jun. 2018, pp. 1-87.

Nokia et al., "Revised SID: Study on NR Industrial Internet of Things (IoT)", 3GPP TSG RAN meeting #81, RP-182090, Sep. 10-13, 2018, 5 pages.

3GPP, "NR; Medium Access Control (MAC) protocol specification (Release 15)" 3GPP TS 38.321 V15.3.0, Sep. 2018, pp. 1-76.

Huawei et al., "New SID on Physical Layer Enhancements for NR Ultra-Reliable and Low Latency Communication (URLLC)", 3GPP TSG-RAN#81, RP-182089, Sep. 10-13, 2018, 5 pages.

InterDigital, "Scheduling aspects of UL intra-UE prioritization", 3GPP TSG RAN WG2 Meeting #104, Spokane, U.S.A., Nov. 12-16, 2018, R2-1816778, pp. 1-4.

Lenovo, Motorola Mobility, "Intra-UE DL/UL Prioritization", 3GPP TSG RAN WG2 Meeting #104, Spokane, USA, Nov. 12-16, 2018, R2-1817505, pp. 1-4.

Nokia, Nokia Shanghai Bell, "On intra-UE DL/UL prioritization for NR URLLC", 3GPP TSG RAN WG1 Ad-Hoc Meeting 1901, Taipei, Taiwan, Jan. 21-25, 2019, R1-1900934, pp. 1-8.

Sony, "Considerations on intra-UE transmission multiplexing & prioritisation", 3GPP TSG RAN WG1 Ad-Hoc Meeting 1901, Taipei, Taiwan, Jan. 21-25, 2019, R1-1900376, pp. 1-11.

Vivo, "SR cancellation for URLLC service", 3GPP TSG RAN WG2 Meeting #104, Spokane, USA, Nov. 12-16, 2018, R2-1816944, pp. 1-6.

ZTE, "Discussion on intra-UE multiplexing", 3GPP TSG RAN WG1 Ad-Hoc Meeting 1901, Taipei, Jan. 21-25, 2019, R1-1900076, pp. 1-8.

\* cited by examiner

COMMUNICATIONS DEVICE, INFRASTRUCTURE EQUIPMENT AND METHODS

CROSS-REFERENCE TO RELATED APPLICATIONS

The present application is based on PCT filing PCT/EP2020/050297, filed Jan. 8, 2020, which claims priority to EP 19152670.6, filed Jan. 18, 2019, the entire contents of each are incorporated herein by reference.

BACKGROUND

Field

The present disclosure relates to communications devices, infrastructure equipment and methods for the transmission of data by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

An example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of communications devices associated with different traffic profiles gives rise to new challenges for efficiently handling communications in wireless telecommunications systems that need to be addressed.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
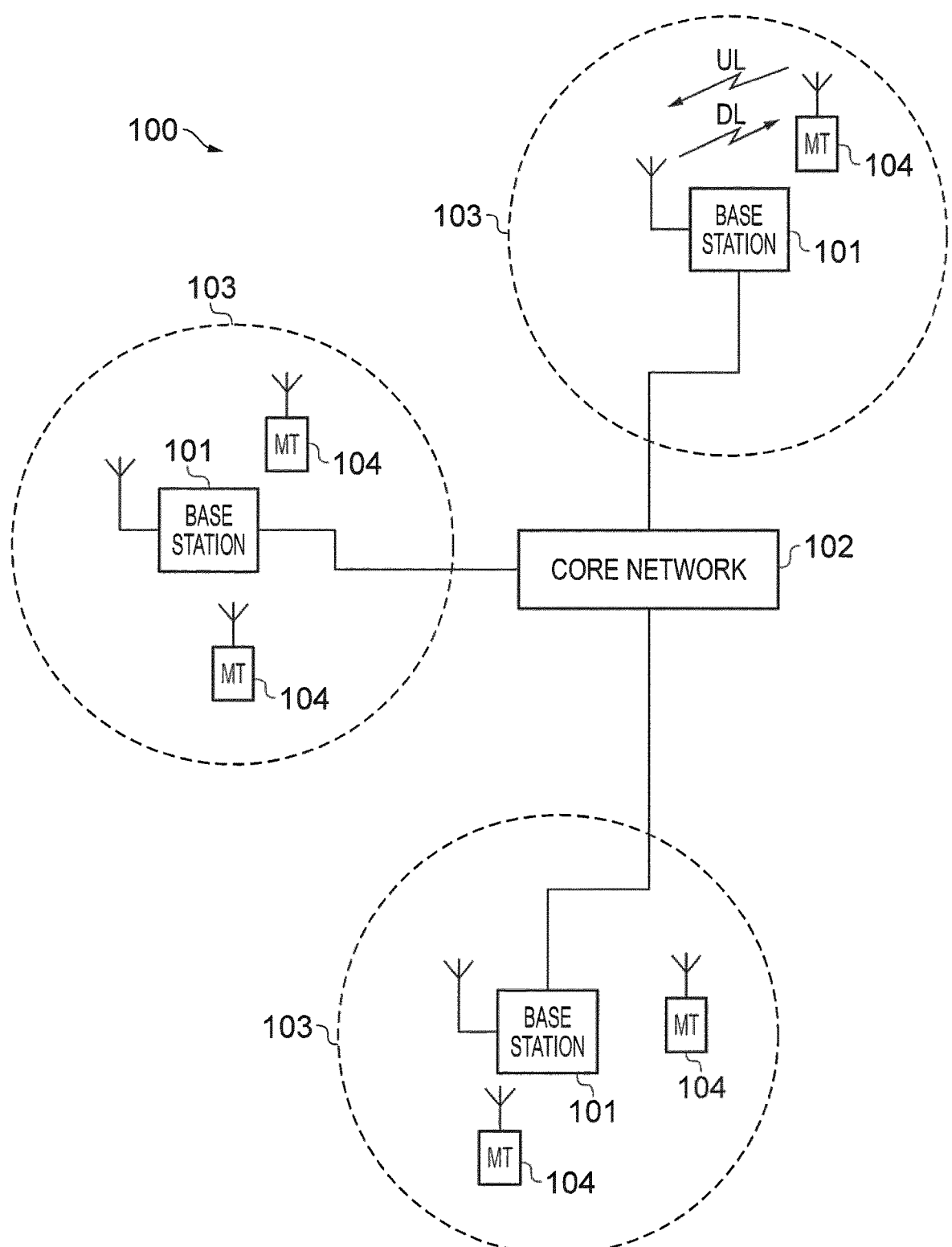
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [9]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
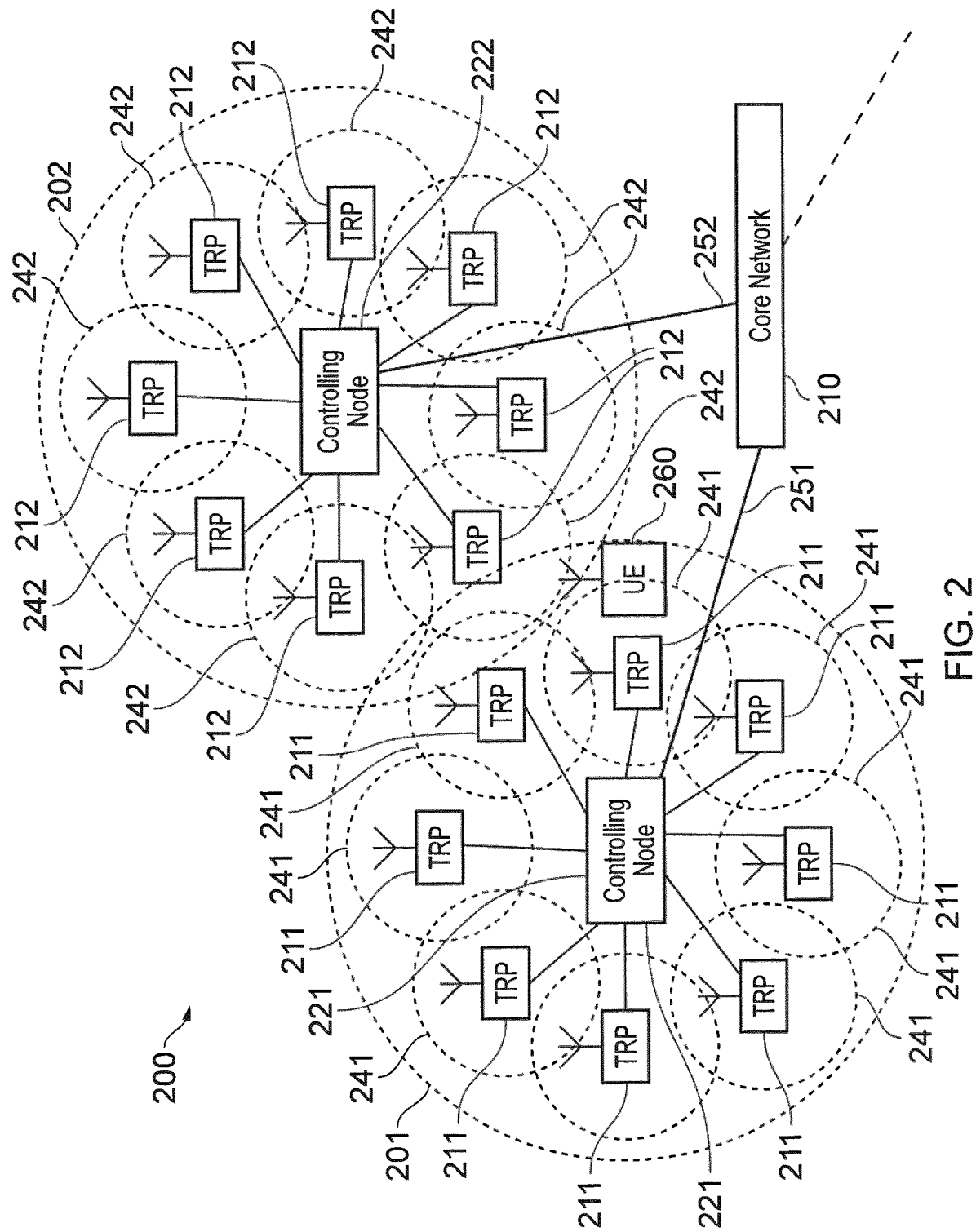
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 15:
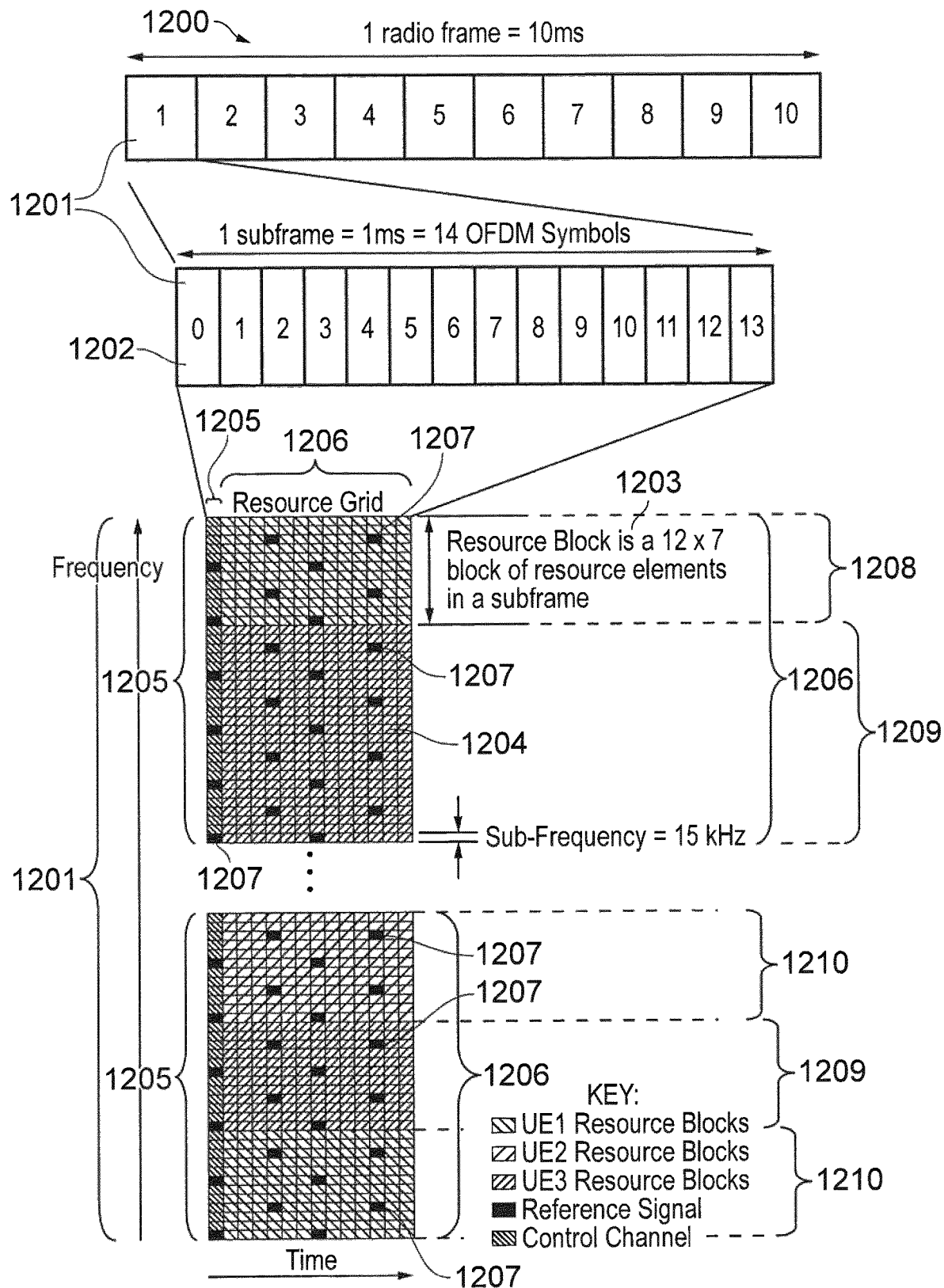
FIG. 15 is a schematic representation of a downlink of a wireless access interface according to the 3GPP LTE standard.
Figure 16:
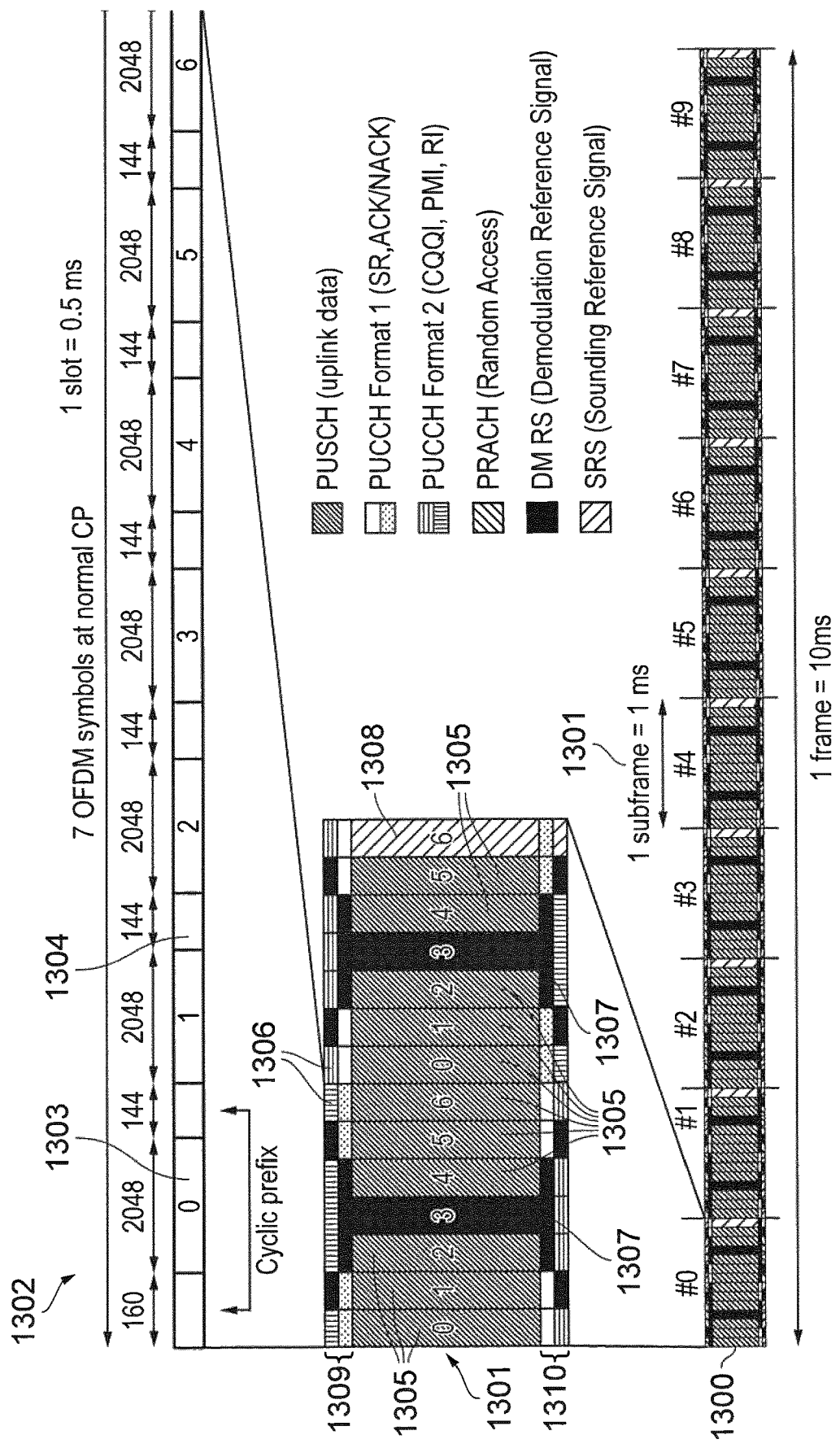
FIG. 16 is a schematic representation of an uplink of a wireless access interface according to the 3GPP LTE standard.

A better appreciation provided by the example embodiments can be gained from reviewing a proposed wireless access interface according to 3GPP LTE/4G and NR/5G. A wireless access interface in accordance with a 3GPP Standard for LTE is described in detail in Annex 1 in which FIGS. 15 and 16 provide detailed representation of a wireless access interface for the downlink and the uplink respectively. More details of the LTE wireless access interface are therefore described in Annex 1. However it will be appreciated that the wireless access interface provides physical communications resources including shared channels for both uplink and the downlink which may be accessed by communicating appropriate control signalling as those acquainted with LTE will appreciate. Equally a wireless access interface for the 5G Standard as represented in FIG. 2 may be similarly formed in accordance with the arrangement shown in Annex 1 and may use OFDM on the downlink and OFDM or SC-FDMA on the uplink.

Figure 3:
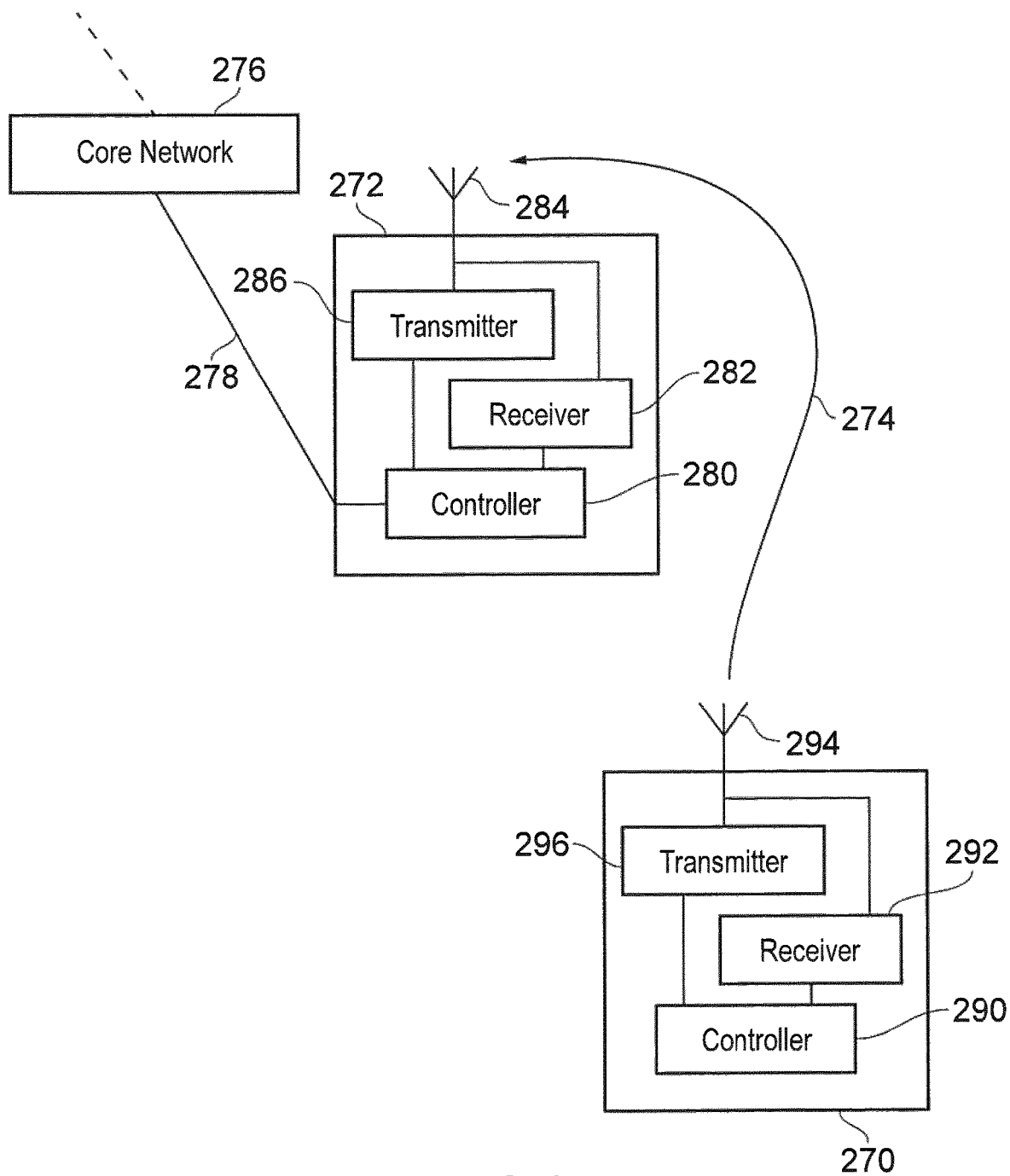
FIG. 3 is a schematic block diagram of an example infrastructure equipment and communications device configured in accordance with example embodiments.

A more detailed illustration of a UE 270 and an example network infrastructure equipment 272, which may be thought of as a gNB 101 or a combination of a controlling node 221 and TRP 211, is presented in FIG. 3. As shown in FIG. 3, the UE 270 is shown to transmit uplink data to the infrastructure equipment 272 via grant free resources of a wireless access interface as illustrated generally by an arrow 274. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

5G, URLLC and Industrial Internet of Things

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable & Low Latency Communications (URLLC) [1] services are for a reliability of $1\text{-}10^{-5}$ (99.999%) or higher for one transmission of a 32 byte packet with a user plane latency of 1 ms [3]. In some scenarios, there may be a requirement for a reliability of $1\text{-}10^{-6}$ (99.9999%) or higher with either 0.5 ms or 1 ms of user plane latency. Massive Machine Type Communications (mMTC) is another example of a service which may be supported by NR-based communications networks.

In addition, systems may be expected to support further enhancements related to Industrial Internet of Things (IIoT) in order to support services with new requirements of high availability, high reliability, low latency, and in some cases, high-accuracy positioning.

Industrial automation, energy power distribution and intelligent transport systems are examples of new use cases for Industrial Internet of Things (IIoT). In an example of industrial automation, the system may involve different distributed components working together. These components may include sensors, virtualized hardware controllers and autonomous robots, which may be capable of initiating actions or reacting to critical events occurring within a factory and communicating over a local area network.

The UEs in the network may therefore be expected to handle a mixture of different traffic, for example, associated with different applications and potentially different quality of service requirements (such as maximum latency, reliability, packet sizes, throughput).

In order to permit a communications device to transmit data associated with multiple traffic classes in a timely manner, multiple configured grants/semi-persistent scheduling (SPS) grants may be required in order to provide more flexibility while avoiding excessive dynamic downlink control signalling.

One of the aspects of URLLC being developed for 5G/NR to support IIoT is a requirement for URLLC to provide a low latency, measured from the ingress of a layer 2 packet to its egress from the network, with a proposed target of 1 ms with a reliability of 99.999%. This is required in order to support the services for IIoT which require high availability, high reliability, low latency, and in some cases, high-accuracy positioning [1]. Furthermore, one of the requirements for communicating uplink data from a UE is to manage intra-UE packet prioritization and multiplexing. This is a requirement to prioritise the communication of uplink data and control packets from different categories of traffic within the UE. A better appreciation of the generation of uplink data of different logical types will be provided in the following section.

Uplink Logical Channel Prioritization

Figure 4:
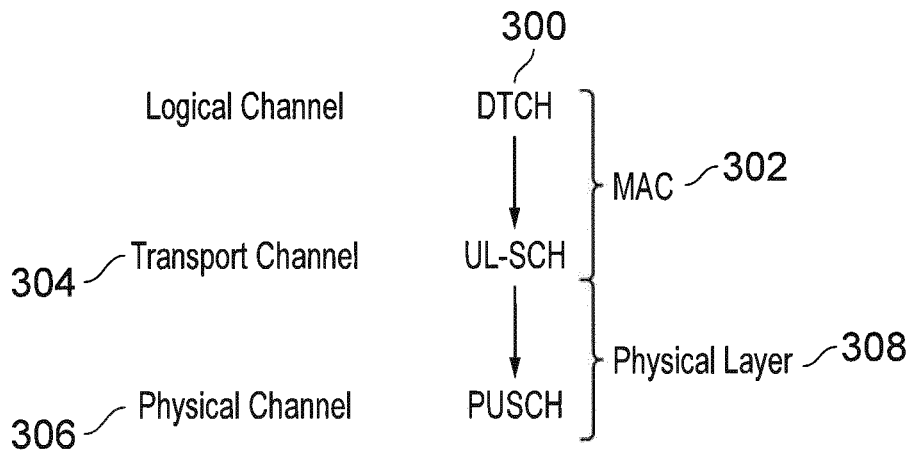
FIG. 4 is a schematic illustration of the processing of data for uplink transmission by a medium access control (MAC) layer and a Physical layer of a communications device, which may be in accordance with embodiments of the present disclosure.

Uplink data for communication to a wireless communications network may be required to support different services by communicating different types of information and control information. Such data is received from higher layers at a medium access control (MAC) layer. Different types of information are therefore categorized into different Logical Channels. For example MIB or SIB information and user data information are different types of information and therefore they belong to different Logical Channels, namely Broadcast Control Channel (BCCH) and Dedicated Traffic Channel (DTCH) respectively. An illustration is shown in FIG. 4, in which a MAC layer 302 at the UE 270 maps a Logical Channel DTCH 300 to a Transport Channel comprising an Uplink Shared Channel (UL-SCH) 304. As shown in FIG. 4, The UL-SCH Transport Channel 304 is then mapped to a Physical Uplink Shared Channel (PUSCH) 306 within a physical layer 308. The different types of Logical Channels, e.g. BCCH, DTCH, DCCH, have different requirements or priorities and to distinguish them, they are each assigned a different Logical Channel Identity (LCD). Even among data traffic (DTCH) there can be different priorities or requirements and hence multiple DTCH having different priorities may be categorized into different Logical Channels, each having a respective Logical Channel Identity (LCID). Each LCD can be independently configured by the network.

As in LTE, in NR the UE does not decide the number of physical resources it can use to transmit its uplink data but rather, it is the gNB that decides the physical resources, e.g. using a PUSCH, that the UE can use for the transmission of its data. In 3GPP Release-15 NR, the gNB allocates the PUSCH resource to a particular UE for the transmission of data traffic by that particular UE, but does not allocate the resources to a particular logical channel (DTCH) of the UE. That is, the gNB allocates the UE uplink resources for the transmission of a Transport Block (TB) having a Transport Block Size (TBS) which is dependent upon the allocated PUSCH resources (i.e. number of PRBs, OFDM symbols) and a modulation and coding scheme (MCS) with which the TB is to be encoded and transmitted. The PUSCH resources can be dynamically granted to the UE, for example via a downlink control information (DCI). Alternatively, PUSCH resources can be semi-statically configured, in which case the PUSCH resources may be referred to as a configured grant resource.

Since the transport block is not assigned to transmit data from a particular logical channel, but rather can potentially include data from all (or at least a plurality) of the logical channels, the UE needs to perform Logical Channel Prioritization function [2]. That is, the MAC layer 302 at the UE 270 needs to decide from which logical channel(s) the data shall be selected to form the TB to be transmitted using the allocated resources. The MAC layer 302 can multiplex data from multiple logical channels into a single TB.

Figure 5:
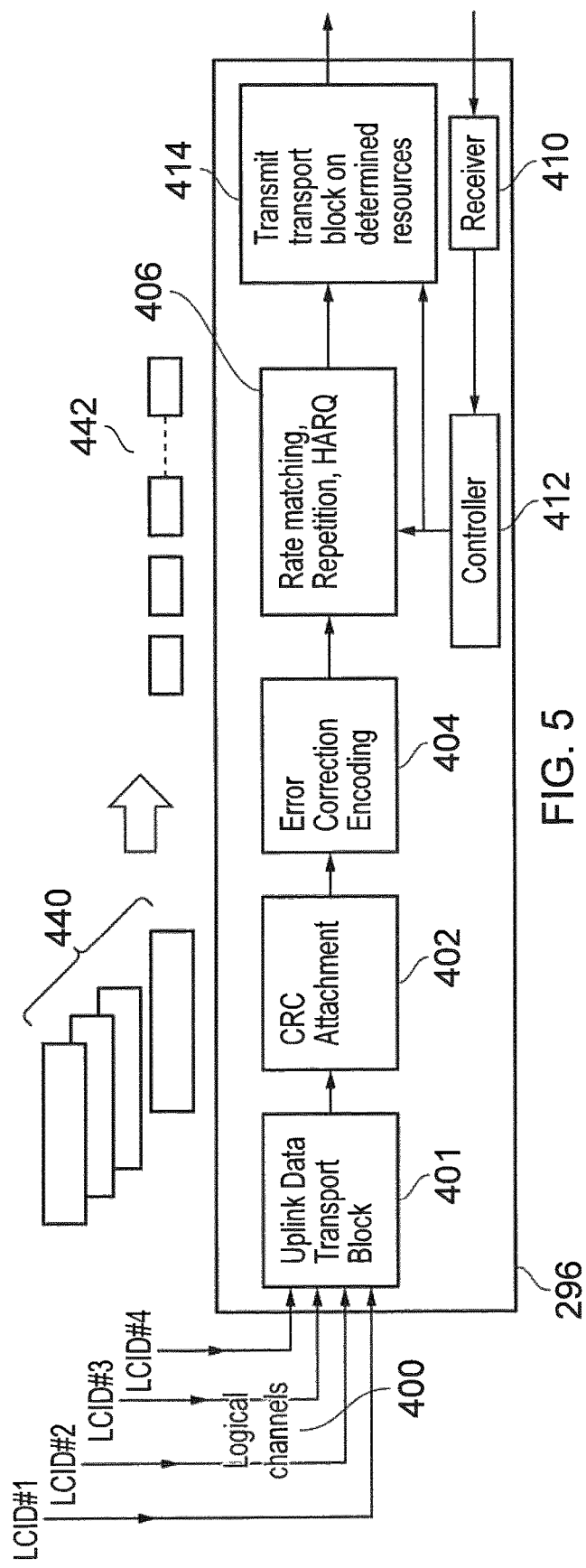
FIG. 5 is a schematic block diagram of an example transmitter which forms uplink data from different logical channels.

An example transmitter which forms uplink data from different logical channels into transport blocks and transmits the data on PUSCH resources is shown in FIG. 5. As shown in FIG. 5, uplink data for transmission from four logical channels each with a different channel identifier LCID #1, LCID #2, LCID #3, LCID #4 is formed in a medium access control layer into transport blocks 440 by an uplink data transport block former 401 forming part of an uplink physical layer by the transmitter 296. The uplink transport blocks 440 are then fed to a CRC Attachment block 402, which calculates a cyclic redundancy check (CRC) for each transport data block before passing the combined CRC parity check bits and data bits to an error correction encoder 404. The error correction encoder 404 encodes the CRC and the data bits of the transport blocks to form error correction encoded transport blocks 442 for transmission on the allocated resources. The error correction encoded transport blocks 442 are then received by a rate matching, repetition and hybrid automatic repeat request (HARQ) block 406. The rate matching, repetition and HARQ block 406 is controlled by a controller 412 to generate encoded data units for transmission by a transmission block 414. The rate matching, repetition and HARQ block 406 is controlled by the controller 412 to form encoded data units from each transport block which may be transmitted repeatedly to improve a likelihood of receiving the uplink data correctly accordingly to a conventional technique. The rate matching, repetition and HARQ block 406 may be also controlled to use a hybrid automatic repeat request process to transmit the transport blocks based on whether a CRC check is determined to be correct at the receiver.

Thus the transmitter 296 may perform the functions of the MAC layer 302 and the Physical layer 308 shown in FIG. 4.

Figure 6:
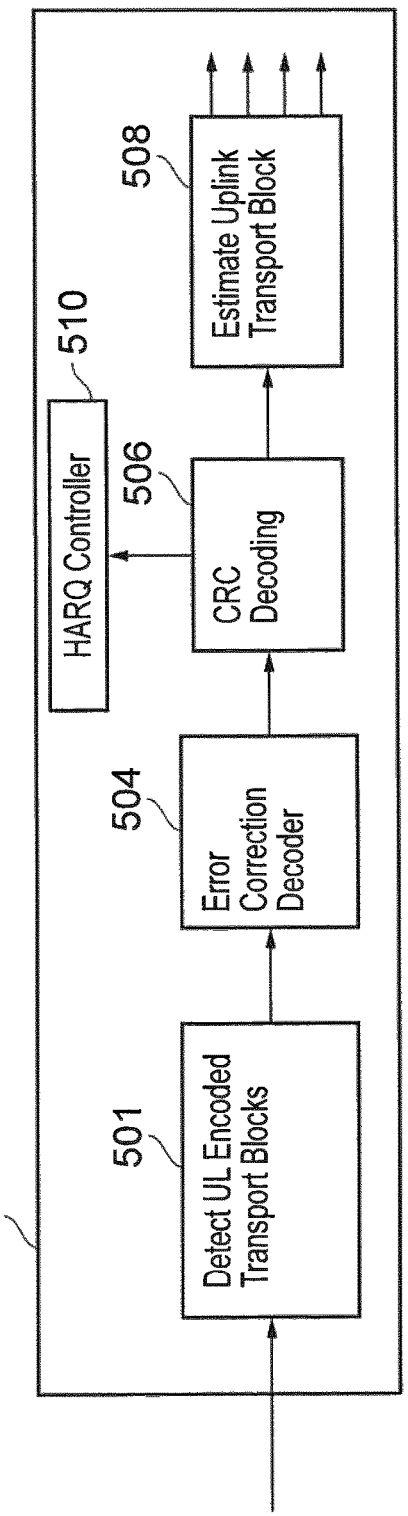
FIG. 6 is a schematic block diagram of an example receiver which receives uplink data associated with different logical channels.

A schematic block diagram of the receiver 282 of the infrastructure equipment 272 for detecting radio signals transmitted from the UE 270 and for decoding the encoded transport block represent by the radio signals is shown in FIG. 6 for completeness. As shown in FIG. 6 a detection block 501 detects the encoded units of data transmitted from the UE 270. As explained, the encoded data units making up each encoded transport block may be transmitted using a HARQ scheme in which the same encoded data unit may be transmitted repeatedly in the allocated uplink resources. Therefore after detecting the encoded data units the encoded transport blocks are reassembled from the encoded data units and the encoded transport blocks fed to an error correction decoder 504. The error correction decoder 504 decodes the encoded transport block and generates an estimate of the data in accordance with the error correction encoding scheme being used at the transmitter. A CRC decoder 506 performs CRC in accordance with a conventional arrangement to detect whether the uplink data in the transport block has been correctly received which outputs the uplink data to a processing block 508.

The uplink data from different logical channels is therefore transmitted in transport blocks via the physical layer. However as mentioned above, once the transport blocks are formed, there is currently limited differentiation with respect to a priority with which the data is transmitted.

Conventionally, at the MAC layer, each LCID has (i.e., is associated with) a configured priority (whereby a lower number may correspond to a higher priority) and a Maximum Bucket Size, where the Maximum Bucket Size is derived from the configured parameters prioritisedBitRate and bucketSizeDuration, i.e. Maximum Bucket Size=prioritisedBitRate×bucketSizeDuration. A Logical Channel Prioritization function performed at the MAC layer 302 maintains a dynamic bucket, B; (bits) for LCID j, such that:

Prior to allocation, bucket $B_j$ is incremented by prioritisedBitRate×$T_{Bucket,j}$, where is $T_{Bucket,j}$ is the time between updates of the bucket $B_j$. The value of $T_{Bucket,j}$ is up to UE implementation. The value of $B_j$ cannot be greater than the Maximum Bucket Size for LCID j.

Figure 7:
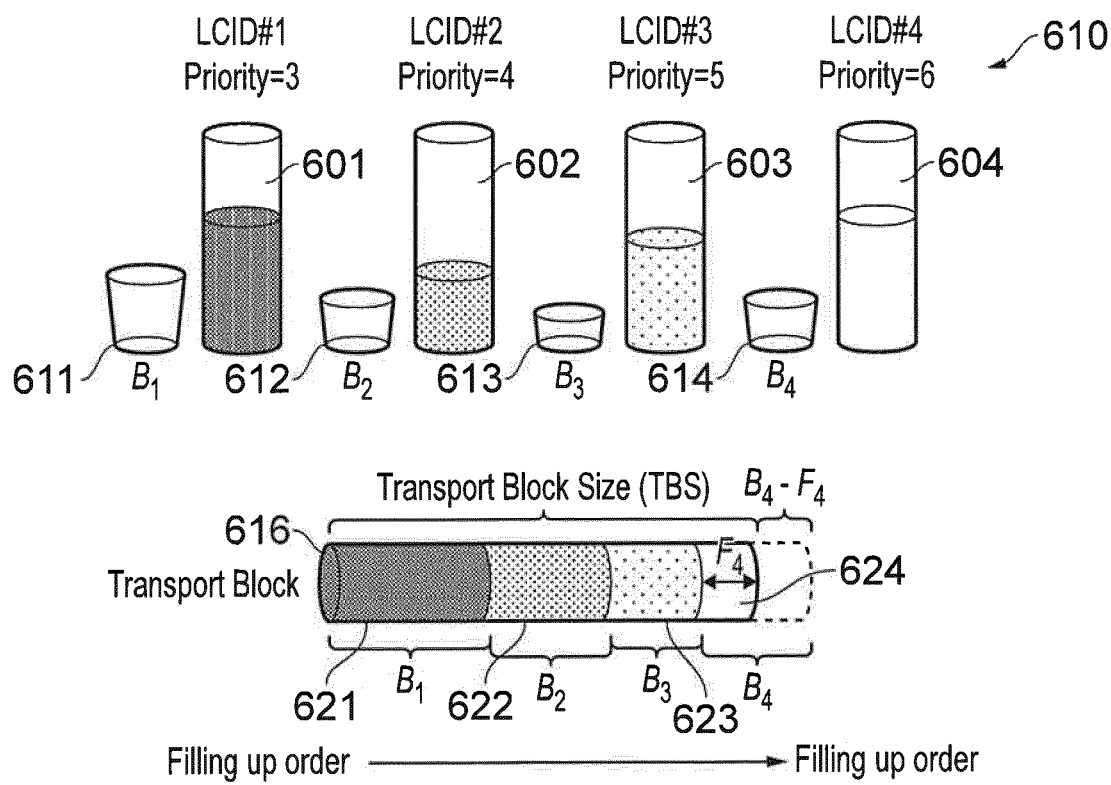
FIG. 7 is an illustration of a Logical Channel Prioritization scheme for forming a transport block.

After allocation, bucket $B_j$ is reduced by the number of bits that LCID j are carried by the TB An example Logical Channel Prioritization process is shown in FIG. 7 for the four logical channels with different LCIDs LCID #1, LCID #2, LCID #3, LCID #4. Each logical channel has a corresponding data buffer 601, 602, 603, 604 in which data to be transmitted is stored. In the example of FIG. 7, the logical channels LCID #1, LCID #2, LCID #3, LCID #4 are configured with priority values 3, 4, 5 and 6 respectively, so that logical channel LCID #1 is associated with a priority which is higher than that associated with any other logical channel, and logical channel LCID #4 is associated with a priority which is lower than that associated with any other logical channel. Each of the logical channels LCID #1, LCID #2, LCID #3, LCID #4 is assigned a bucket 611, 612, 613, 614. As indicated above, each of the buckets 611, 612, 613, 614 for the logical channels LCID #1, LCID #2, LCID #3 & LCID #4 have sizes $B_1$, $B_2$, $B_3$ & $B_4$ respectively. One can view each data buffer as a container and the data in the buffer as liquid in the container. The Transport Block 616 can be seen as a tank. The task of the Logical Channel Prioritization is the use the bucket for each respective logical channel to "scoop" data from its corresponding data buffer "container" into the Transport Block "tank". It will be apparent from the definitions above that, irrespective of the quantity of data stored in a data buffer associated with logical channel LCID j, at most $B_j$ bits can be "scooped" into (i.e. included in) a given transport block.

Conventionally, data may be selected for inclusion in the transport block by starting with logical channel having the highest priority (i.e. the channel associated with lowest numbered priority). Here, the logical channel with LCID #1 is "scooped" (i.e. allocated) first before data associated with the logical channel having LCID #2, because the data associated with LCID #1 has a higher priority (i.e. a lower priority number) than that associated with LCID #2. The process may continue with the data associated with LCID #3 then the data associated with LCID #4.

The Transport Block 616 has a limited size (TBS) as shown in FIG. 7 and it may be filled before all logical channels have been considered. In the example in FIG. 7, the TB 616 can accommodate data with size B1, B2 and B3 as shown 621, 622, 623. However, the data associated with LCID #4 has the lowest priority, and there is not enough remaining space in the transport block 616 to fully accommodate an amount of data corresponding to the size of its bucket B4. Therefore, the remaining space 624 in the TB, labelled as F4 in FIG. 7, contains an amount of data, associated with LCID #4, which is less than the size of bucket B4. In this example, after the allocation, the size of the buckets B1, B2 and B3 are reduced to zero (since the TB can fully carry all their data) and bucket B4 is reduced by F4, corresponding to the amount of data associated with LCID #4 included in the TBS 616.

In previously proposed standards (Release-15 NR), each LCID may also be configured with an allowedSCS-List and a maxPUSCH-Duration.

The allowedSCS-List is a set of subcarrier spacings of the PUSCH that the LCID is allowed to use. That is, for example, if the scheduled PUSCH has a subcarrier spacing of 60 kHz and a LCID has an allowed set of subcarrier spacings of {15 kHz, 30 kHz} then the data from this LCID is not allowed to be multiplexed into a TB using PUSCH resources having a 60 kHz subcarrier spacing.

The maxPUSCH-Duration is a maximum permitted duration of allocated PUSCH resources, expressed in milliseconds which can be used for the transmission of data for that LCID. Data from the associated LCID is allowed to be multiplexed into a TB using such PUSCH resources only if the duration of the resources is not greater than the maxPUSCH-duration parameter. This prevents a LCID that has a low latency requirement to be carried by PUSCH resources that have a very long duration thereby causing the LCID to exceed its latency requirement. For example:

LCID #1: maxPUSCH-Duration=0.5 ms
LCID #2: maxPUSCH-Duration=0.04 ms
If the allocated PUSCH occupies 4 OFDM symbols at 15 kHz, i.e. 0.286 ms, then:
Data from LCID #1 is allowed to be multiplexed into this TB since the PUSCH duration is less than its maxPUSCH-Duration of 0.5 ms
Data from LCID #2 is NOT allowed to be multiplexed into this TB since the PUSCH duration is larger than its maxPUSCH-Duration of 0.04 ms The following are parameters may be configurable for an Uplink Logical Channel which we use as reference in the present disclosure:

Logical Channel ID (LCID): As described above, it is used to distinguish one type of Logical Channel from another Priority: A rank of the priority of the logical channel where the lower the number the higher the priority prioritisedBitRate: As described above to determine the Bucket Size $B_j$. This is a representation of the bit rate requirement of the Logical Channel.

bucketSizeDuration: As described above to determine the Bucket Size $B_j$.

maxPUSCH-Duration: As described above, data from this Logical Channel is multiplexed into the TB if the corresponding granted PUSCH duration does exceed this variable allowedSCS-List: A set of subcarrier spacing where, data from this Logical Channel is multiplexed into the TB if the subcarrier spacing of the granted PUSCH falls into a subcarrier spacing in this set.

Scheduling Request ID (SR ID): When this Logical Channel requires an UL grant, it would trigger for a Scheduling Request and if the SR ID is configured, it will use the physical uplink control channel (PUCCH) resources corresponding to this SR ID.

Logical Chanel Group ID (LCG-ID): Buffer Status Report (BSR) is triggered when any LCID's belonging to this LCG-ID has data in its buffer. That is the BSR reports the data buffer status of all the LCID's within a LCG-ID.

Dynamic Grant Intra-UE Data Packet Collisions

As will be appreciated in order to transmit the transport blocks of uplink data the UE requires communications resources of the uplink. However if the different services are being supported by the same UE, then the UE may require access to uplink communications resources from different services which may conflict, which can be considered to be intra-UE data collisions. Previous studies [3] have been made into different scenarios of intra-UE data collisions including those caused by dynamic grants. A dynamic grant, for example, is one in which resources are scheduled by the wireless communications network (gNB) by transmitting downlink control information (DCI) to the UE to allocate resources for uplink transmission of transport blocks. Intra-UE data collision scenarios can include:

1. Downlink dynamic grant collisions (packet downlink shared channel (PDSCH) with PDSCH)
2. Uplink dynamic grant with uplink configured grant collisions (PUSCH with PUSCH)
3. Uplink dynamic grant collisions (PUSCH with PUSCH)

For the first scenario where two dynamic grant PDSCH collides, 3GPP suggested that the later grant has priority. This assumes that the scheduler at the gNB has knowledge of the priorities of the downlink packets.

The second scenario where an uplink dynamic grant collides with an uplink configured grant to provide Intra-UE prioritization and multiplexing solutions for handling a mixture of different traffic for iIoT is addressed in the Applicant's co-pending patent application EP 18214944.3 [4] the contents of which are incorporated herein by reference. According to the arrangement disclosed in [4], intra-UE collisions are addressed where multiple configured grants are active and collisions with dynamic grant occur.

In the third scenario where two uplink dynamic grants collide, there is a requirement for a UE to be configured at the physical layer to identify the priorities between two uplink grants. Such a configuration does not exist in earlier versions of 3GPP standards (Rel-15), that is, the physical layer does not distinguish the type of traffic scheduled by uplink grant or downlink grant.

In our co-pending patent application EP 18185553.7 [5], it has been proposed that a format of the DCI can be used to distinguish between URLLC and eMBB transmission. Later during the Rel-16 URLLC Study Item [6], there have also been proposals to introduce a new DCI format for URLLC data.

However, the inventors recognised that even for URLLC transmission there can be different latency and reliability requirements within a UE, for example in Appendix A2 of the Technical Report for the Rel-16 NR URLLC Study Item [7], the Power Distribution use case requires a 99.9999% reliability and a 5 ms latency for grid fault and management and 99.999% reliability and 15 ms latency for differential protection. Another example is for Augmented Reality and Virtual Reality which has two different latency requirements, for example 1 ms and 7 ms for different packet sizes. It is not expected to have a different DCI format for every different URLLC requirement but rather a single DCI format for all URLLC scheduling and hence there is a need to distinguish the different traffic types for each transmission.

The inventors of the present example techniques have appreciated that there is a possibility that communications resources allocated for the transmission of data to or by the communications device may overlap or otherwise conflict, and that there is thus a need to resolve such conflicts.

Techniques in accordance with the embodiments disclosed herein may also provide for an improved intra-UE logical channel prioritisation.

Providing Network Directed Priority for Intra-UE Logical Channel Transmission

Embodiments of the present technique can provide an arrangement in which a wireless communications network can influence a priority with which data from different logical channels is allocated to an available capacity of a transport block when transmitting the transport block at the physical layer.

Embodiments of the present technique may additionally or alternatively provide for the prioritisation of the transmission of the transport block with respect to the transmission of other transport blocks as a function of an implicitly or explicitly determined prioritisation, based for example on communications parameters for transmission. More particularly embodiments of the present technique concern the third scenario mentioned above in which two dynamic grants collide, although some of the embodiments are also applicable to the first and the second scenarios in which downlink or uplink dynamic grants collide.

According to a first aspect, embodiments of the present technique can provide a method of transmitting data by a communications device in a wireless communications network, the method comprising receiving a first downlink control message comprising an indication of a first dynamic grant allocating first uplink communications resources for transmission of data by the communications device, receiving a second downlink control message, the second downlink control message comprising an indication of a second dynamic grant allocating second uplink communications resources for transmission of data by the communications device, determining that the second uplink communications resources comprise at least a portion of the first uplink communications resources, determining that the first uplink communications resources are associated with a higher priority than the second uplink communications resources, and in response to the determining that the first uplink communications resources are associated with a higher priority than the second uplink communications resources, transmitting a transport block using the first uplink communications resources.

According to a second aspect there is provided a method of transmitting data by a communications device in a wireless communications network, the method comprising receiving a data from each of a plurality of logical channels, each of the logical channels having an assigned relative priority, receiving a first downlink control message allocating first uplink communications resources of a wireless access interface for transmitting a transport block which is to carry the data from one or more of the plurality of logical channels, determining, based on the received first downlink control message, a priority for filling an available capacity of the transport block with the data from one or more of the plurality of logical channels, and transmitting the transport block in the allocated first uplink communications resources.

Priority Determination Based on DCI

Embodiments according to a first aspect of the present technique can introduce a priority indicator in a downlink control channel message associated with the grant of resources such as the downlink control information (DCI) which provides an indication from the network from which the UE can determine a priority for transmitting data from different logical channels in a transport block at the physical layer. This priority indicator can be explicit, e.g. a field in the DCI, or implicit. A priority for transmitting data from different logical channels can be determined from the DCI format or if two DCIs have the same format, the priority is determine by the information from the DCI.

As will be explained in the following paragraphs example embodiments provide different example of explicit or implicit signalling of a prioritisation of different logical channels using a DCI transmission. An illustration of a DCI transmission for granting uplink communications resources is shown in FIG. 8.

DCI Transmissions for Allocating Communications Resources.

Figure 8:
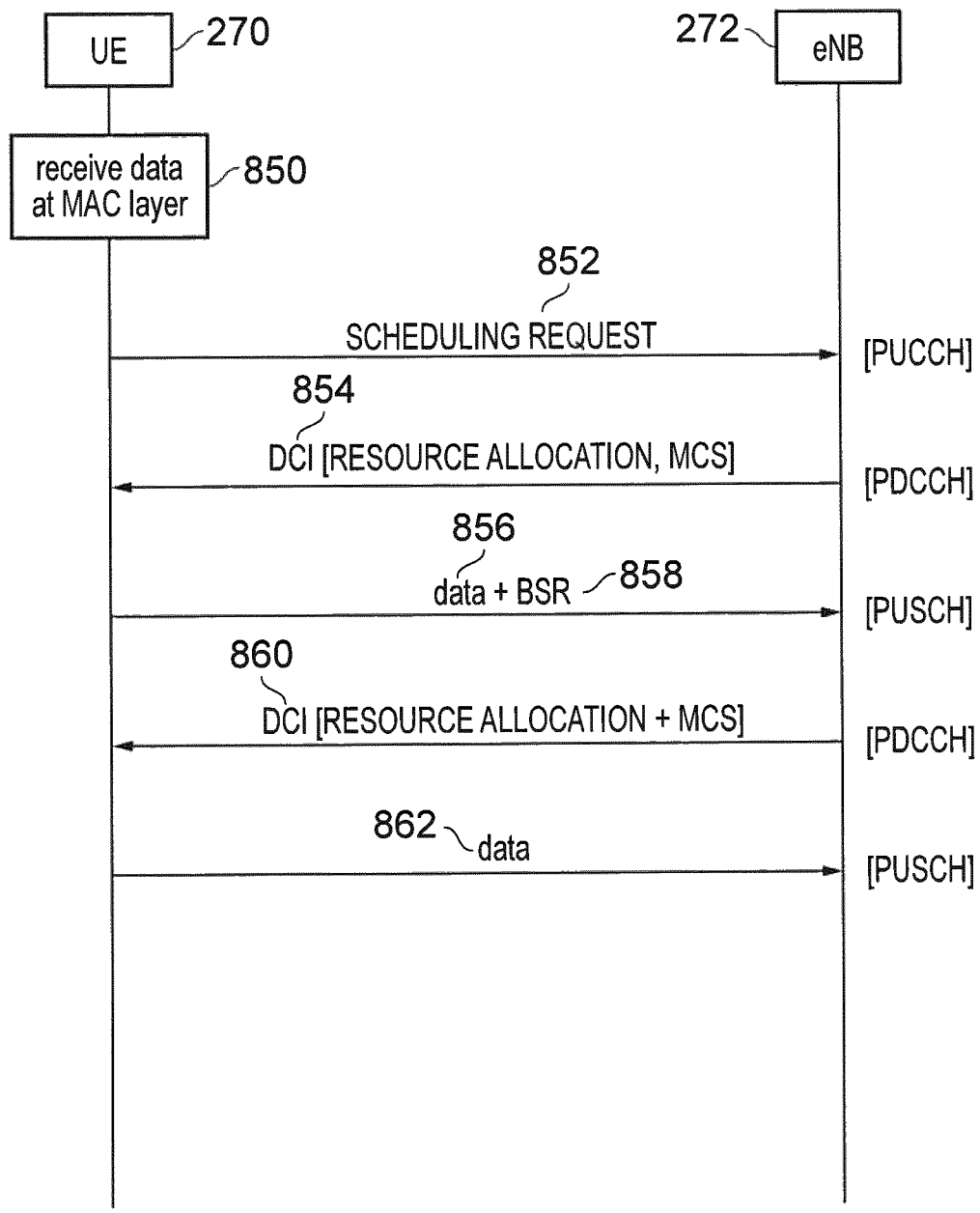
FIG. 8 is a message sequence chart illustrating transmissions for granting uplink communications resources.

FIG. 8 illustrates a message sequence chart showing a transmission of data using grant-based resources, in accordance with conventional techniques.

At step 850, data arrives from upper protocol layers at a buffer at the medium access control (MAC) protocol layer 302 of the UE 270. If, as in the example of FIG. 8, if the UE 272 has no uplink transmission/resources scheduled, the UE 270 may transmit, in response, a Scheduling Request (SR) 852 to the network (e.g. to the infrastructure equipment 272).

The scheduling request 852 is transmitted in PUCCH resources allocated to the UE 272. A UE can be configured with multiple SR resources, each of which is allocated a different identifier (SR ID). The different SR resources can be allocated to multiple PUCCH resource with independent time resources such as periodicity and frequency resources. Each SR ID is configured to a PUCCH resource and different SR ID can share the same PUCCH resource. The PUCCH resources can also overlap in time and frequency.

In response to receiving the SR 852, the network (for example, the infrastructure equipment 272) may send an Uplink Grant carried by downlink control information (DCI) 854 to the UE 272. The DCI may be transmitted on a physical downlink control channel (PDCCH).

The Uplink Grant may comprise an indication of uplink communications resources which are allocated (or, in other words, scheduled) for the UE to transmit its uplink data.

The uplink communications resources may be associated with modulation and coding scheme (MCS) parameters. The MCS parameters may be selected by the infrastructure equipment 272 in order to satisfy one or more of reliability, data throughput and latency requirements associated with the data to be transmitted using the resource allocation.

In response to receiving the DCI 854 comprising the allocation, the UE 272 transmits data 856 on the allocated uplink communications resources. The uplink communications resources may be on a physical uplink shared channel (PUSCH).

Prior to transmitting the data 856, the UE 270 may determine that, even after the transmission of the data 856, it will still have buffered data to transmit. Therefore, it uses a portion of the uplink communications resources allocated by the DCI 854 to transmit a buffer status report (BSR), indicating an amount of data in the MAC layer buffer(s).

In response to receiving the BSR 858, the infrastructure equipment 272 may send a second Uplink Grant carried by a second downlink control information (DCI) 860 to the UE 272 on a physical downlink control channel (PDCCH).

In response to receiving the second DCI 860 comprising the second allocation, the UE 272 transmits second data 862 on the allocated uplink communications resources, and the process ends.

Grant Based and Grant Free Allocations

Resource allocations of the type shown in FIG. 8, where resources are allocated on an ad-hoc, one-off basis, may be known as a grant based resource or 'dynamic grant' (DG). Grant based resources are suitable for services where the data arrives in variable amounts, and/or is aperiodic, even if the data traffic arrival follows a somewhat predictable traffic pattern. DGs may be signalled by the gNB at the physical layer.

On the other hand, grant free resources are a set of periodically repeating uplink communications resources which are semi-statically configured by the network for the use of the communications device for uplink transmission. Such resources may also be referred to as a 'configured grant' (CG). Grant free resource allocation (which may also be referred to as 'semi-persistent scheduling' (SPS)) is particularly suitable for services that generate periodic data traffic, where the amount generated is broadly constant over time. CGs may be signalled at a radio resource control (RRC) layer.

Grant free resources can improve the efficiency with which communications resources are used, since there is no need for either a SR or uplink grant to be transmitted in respect of each uplink data transmission.

Communications resources may thus be configured for a communications device in accordance with quality of service requirements associated with particular services. Where a single communications device generates data for transmission which comprises data associated with different quality of service requirements, for example because it is associated with different services, the communications device may be configured with multiple resource grants. These multiple resource grants may comprise zero, one or more dynamic grants, and zero, one or more configured grants.

Allocated communications resources may be those which are selected for the transmission of data by the communications device. In the case of a dynamic grant, the communications resources indicated by the dynamic grant are allocated for the communications device. In the case of configured grants, the communications device may select (i.e. allocate) one or more instances of the communications resources corresponding to the configured grant for a transmission by the communications device.

A communications device may thus have multiple active grants. Communications resources configured by these grants may in some instances coincide, for example in the time domain, the frequency domain, or both.

Explicit Priority Indicator

According to one example embodiment, the explicit priority indicator provided by a DCI may be the highest priority logical channel identifier (LCID). As described previously, each LCID has a Priority parameter for which the lower the Priority value the higher is the priority of the LCID. In this embodiment, the highest priority indicator is the highest priority LCID that the UE can multiplex into a granted PUSCH TB. For example if the highest priority=3, that means the UE can multiplex LCID with priority=3 and above, that is an LCID with priority=2 cannot be multiplexed into this TB. In another example, if DCI #1 has a highest priority=3 and DCI #2 has highest priority=2, that means that the PUSCH TB from DCI #2 may have multiplexed data from higher priority LCIDs and/or may be transmitted with a higher priority than that of DCI #1. In other words, the granted PUSCH from DCI #2 has higher priority than that of DCI #1. It should be noted that this is the highest priority indicator and the TB may not contain data from LCID with that priority if the buffer for that LCID is empty.

In another example embodiment, the explicit priority indicator provided in the DCI may be the lowest priority LCID which may be carried in the PUSCH TB. This is similar to the previous embodiment but instead of putting a lower limit on the Priority value of the data multiplexed in to the TB, this puts an upper limit to the Priority value (note, again the lower the Priority value is the higher its priority). For example if the lowest priority is 5, that means the TB contains LCID with priority 5 or lower, i.e. it can contain LCID with Priorities 1, 2, 3, 4 and 5. In an example, if DCI #1 indicated a lowest priority=3 and DCI #2 indicates a lowest priority=5, then the PUSCH scheduled by DCI #1 has higher priority than the PUSCH scheduled by DCI #2.

Figure 9:
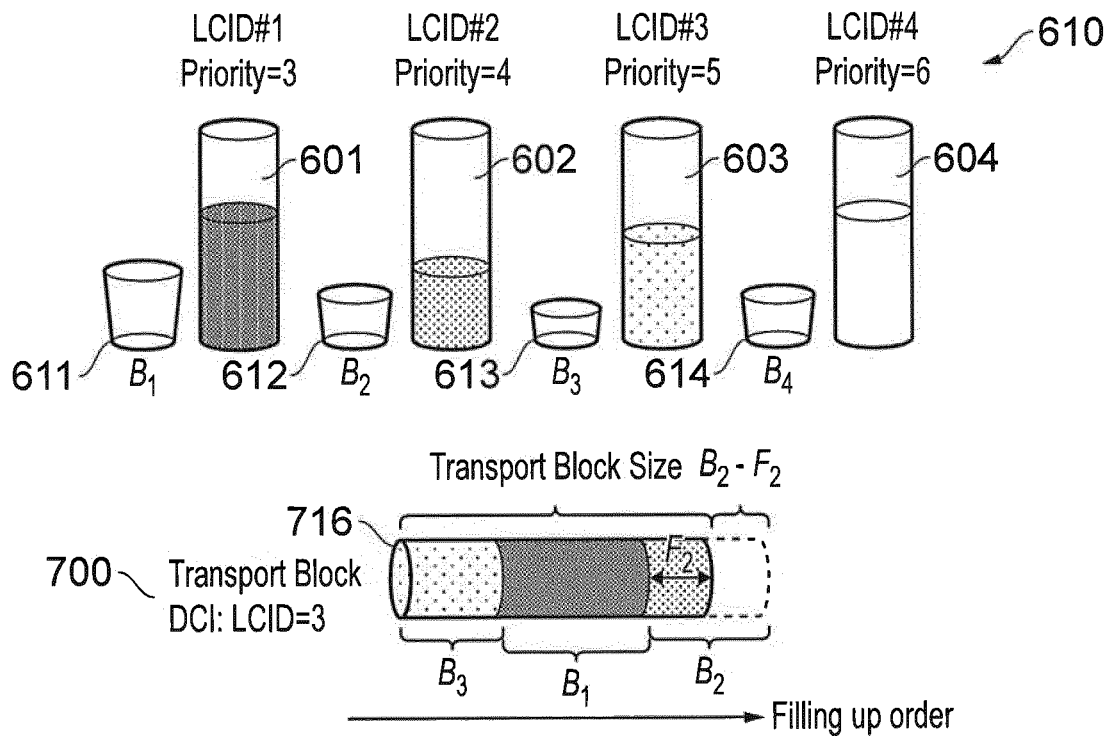
FIG. 9 is an illustration of a Logical Channel Prioritization scheme for forming a transport block in accordance with certain embodiments of the present disclosure.

In another example embodiment, the explicit priority indicator provided in the DCI provides an indication of the data which should be carried in the TB from a main LCID. Here instead of allocating PUSCH resource for a UE, the network allocates PUSCH resource targeting a specific LCID. Since each LCID corresponds to a priority number, the UE can therefore determine the priority of the UL grant. An example is shown in FIG. 9, which corresponds to the example shown in FIG. 7 and so the elements have the same numerical designations and for which inly the differences will be described. As for the example of FIG. 7, in FIG. 9 the logical channels LCID #1, LCID #2, LCID #3, LCID #4 have priorities 3, 4, 5, 6 respectively. If a DCI #1 indicates LCID=3 and DCI #2 indicates LCID=2, then since LCID #2 has higher priority than LCID #3, DCI #2 has higher priority than DCI #1.

According to the example embodiment shown in FIG. 9, a DCI 700 indicates that the TB 716 to be transmitted in the uplink resources granted by the DCI 700 should mainly contain data from the logical channel LCID #3. Therefore data B3 from the logical channel with LCID #3 is multiplexed first into the TB 716. Thereafter a remaining capacity of the TB 700 is filled with data from the logical channels in accordance with their relative priorities. As shown in FIG. 9 data from the logical data channel LCID #1 is included in the TB 716 next B1, because LCID #1 has the highest priority of all LCIDs, other than LCID #3. Then data from the logical channel LCID #2 is added, since it has the next highest priority. Only an amount F2 of the data from the logical channel LCID #2 can be included without exceeding the capacity of the TB 716. There being no remaining space in the TB 716, and LCID #4 being associated with a priority lower than the other LCIDs, no data from the logical channel LCID #4 is included.

In the example of FIG. 9, each LCID is considered in turn, started with the LCID indicated in the DCI, and continuing with the remaining LCIDs in priority order, until the capacity of the TB is filled.

As is apparent from the example in FIG. 9, in some embodiments, the UE's MAC layer can multiplex multiple LCID into a single TB. Hence in another embodiment, the main LCID indicated by the DCI is the first LCID that is multiplexed into the TB 716. In some embodiments, the UE then uses the legacy Logical Channel Prioritization function to fill up the rest of the TB 716. For example in FIG. 9, the LCID indicator=3 and here the UE would firstly fill up the given TB 716 with data from LCID #3 even though LCID #3 has a lower priority than LCID #1 and LCID #2. After the bucket of LCID #3 is fully filled up, the UE then proceed according to the LCD's priority, i.e. starting with LCID #1 and LCID #2. In this example the TBS is not big enough to fully contain the data from LCID #2's bucket.

In some embodiments, only data which is associated with the LCID indicated in the DCI is multiplexed into the TB Priority Based on a Parameter Associated with a Scheduling Request As indicated above in the explanation of the procedure followed by the UE shown in FIG. 8 to be granted uplink resources, the UE transmits a Scheduling Request and in response receives a DCI indicating the uplink resource to transmit the transport block or blocks in those uplink resources.

In another embodiment, the explicit priority indicator is a Scheduling Request (SR) identifier, which may be included in the DCI.

This embodiment recognizes that typically an Uplink Grant is transmitted to a UE in response to a Scheduling Request and in legacy systems, each LCID is also configured with a SR ID. Each SR ID may be associated with allocated communications resources for the UE to transmit a Scheduling Request in respect of one or more LCIDs. The one or more LCIDs associated with a same SR ID may be selected based on the priority of the respective LCIDs. For example, if a LCID has low latency, then the SR ID may be configured with PUCCH resources that have small periodicity, which can provide more opportunities to transmit an SR to request for UL grant of PUSCH resources. The same SR ID may be associated with other LCIDs also having a higher priority.

In some embodiments, the priority of an uplink grant is the highest priority of all the LCID's that share the same SR ID.

For example, consider the LCID configurations as shown in Table 1. The UE may receive two DCIs, DCI #1 with SR ID=1 and DCI #2 with SR ID=2. In this example, the LCID with the highest priority with SR ID=1 is LCID #1 that has priority=3 and the LCID with the highest priority with SR ID=2 is LCID #2 that has priority=4. Hence in this case, DCI #1 which has SR ID=1 has higher priority than DCI #2 which has SR ID=2.

Accordingly, PUSCH resources allocated by DCI #1 have higher priority than PUSCH resources allocated by DCI #2.

TABLE 1

LCID configurations

| LCID | Priority | SR ID |
|---|---|---|
| LCID#1 | 3 | 1 |
| LCID#2 | 4 | 2 |
| LCID#3 | 5 | 1 |
| LCID#4 | 6 | 2 |

Figure 10:
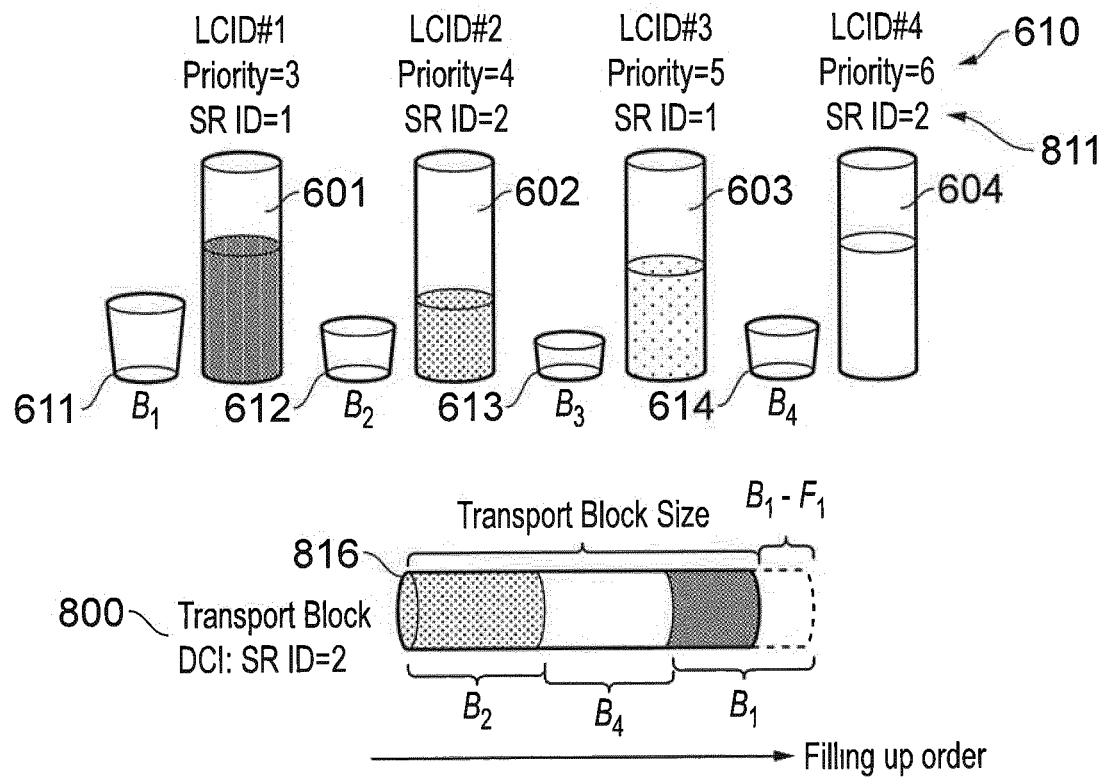
FIG. 10 is an illustration of a Logical Channel Prioritization scheme for forming a transport block in accordance with certain embodiments of the present disclosure.

FIG. 10 provides an example illustration of an embodiment in which a capacity of a TB is allocated according to a priority inferred from an SR ID. FIG. 10 corresponds to the examples provided in FIGS. 7 and 9 and so only the differences with respect to FIGS. 7 and 9 will be described.

As shown in FIG. 10, the UE receives a DCI providing indication of SR ID=2 800 in response to transmitting a scheduling request with the SR ID=2 in the PUCCH. Each of the logical channels LCID #1, LCID #2, LCID #3, LCID #4, is associated with an SR ID as shown in Table 1 above. Having received the DCI indicating SR ID=2, the UE prioritises data from those logical channels which are identified by the SR ID=2 which, as shown in FIG. 10, are the logical channels LCID #2 and LCID #4. The UE therefore uses the data from the logical channels LCID #2 and LCID #4 first to fill the TB 716. As shown in FIG. 10, the data from LCID #2 therefore fills the first section B2 and the data from the logical channel LCID #4 is used to fill the second section B4. Since the logical channel LCID #2 has a higher priority than the logical channel LCID #4, the data from the logical channel LCID #2 is used first. Thereafter the remaining capacity of the TB 816 is allocated in accordance with a relative priority of each of the remaining logical channels LCID #1 and LCID #3. As shown in FIG. 10, the data from the first logical channel LCID #1 has a higher priority than that of LCID #3 and so the capacity of the TB 816 is allocated first the LCID #1 B1. There is not sufficient remaining space in the TB 816 to include an amount of data from logical channel LCID #1 equal to the bucket size B1, and so bucket B1 is only partially emptied, i.e., only F1 out of B1 bits is multiplexed into the TB 816.

According to the example embodiment of FIG. 10, the UE multiplexes data from the logical channel with the SR ID indicated in the DCI into the allocated TB first. After which it may data allocate associated with the remaining LCIDs for inclusion in the TB 816 according to legacy Logical Channel Prioritization procedure. As shown in FIG. 10, the DCI indicates a SR ID=2, and here LCID #2 and LCID #4 are configured with SR ID=2 and hence their data are firstly allocated into the TB even though LCID #2's priority is lower than that of LCID #1, where the TB can fully accommodate their buckets B2 and B4. Since there is available space left in the TB, the UE would allocate the highest priority LCID, which in this case is LCID #1. In this example, only part of bucket B1 can be carried by the remaining space in this TB.

In another embodiment the UE multiplexes data only from one or more LCID with SR ID indicated in the DCI into the allocated TB.

In another embodiment the said explicit priority indicator is the Logical Channel Group ID (LCG-ID). The Buffer Status Report (BSR) of a LCG-ID is triggered when the buffer of any LCID belonging to this LCG-ID is not empty (i.e. data arrives at the buffer). It is assumed that would group LCID with similar requirements. The priority of a LCG-ID can therefore be the highest priority (i.e. lowest valued Priority) among the LCID in the Logical Channel Group. For example if we have the configurations as in Table 2, then if DCI #1 indicates a LCG-ID=1, and DCI #2 indicates LCG-ID=2, since the highest priority in LCG-ID=1 is 3 and the highest priority in LCG-ID=2 is 4, then the PUSCH granted by DCI #1 has higher priority than the PUSCH granted by DCI #2.

TABLE 2

LCG-ID configurations

| LCID | Priority | LCG-ID |
|---|---|---|
| LCID#1 | 3 | 1 |
| LCID#2 | 4 | 2 |
| LCID#3 | 5 | 1 |
| LCID#4 | 6 | 2 |

Prioritising Transmission of a Transport Block on Granted Resources

The above described example embodiments disclose a technique in which a wireless communications network can provide an indication to a communications device of how data from different logical channels LCID #1 can be used to fill an available capacity of transport blocks according to a relative priority of the logical channels.

According to another aspect of example embodiments explained in the following paragraphs, a wireless communications network can also control a priority of transmitting different transport blocks, which may be carrying the data from different logical channels. Different example embodiments for implementing this aspect of controlling a priority with which physical resources of a shared channel are allocated for transmitting different transport blocks will be described in the following paragraphs. In general, embodiments may provide for a determination of a relative or absolute priority associated with communications resource allocations which collide (e.g. where one allocation comprises at least a portion of another).

Based on a determination of a relative or absolute priority associated with the communications resource allocations, the UE may select a portion of the communications resources for transmitting data, for example in the form of one or more transport blocks.

In some embodiments, the determination of a priority associated with uplink resources is based on one or more of the techniques described above for determining a priority for including data associated with a particular LCID within a TB to be transmitted using the allocated uplink resources.

For example, in some embodiments, the priority of uplink resources allocated by means of a DCI may be based on the priority associated with the LCID whose data is to be included in a corresponding TB with the highest priority, as determined in accordance with the embodiments described above. It should be noted that this may be different from the highest priority associated with any data which could be included within such a TB. For example, with regards to the example illustrated in FIG. 9, data having priority=3 may be included in the TB 716. However, the data which is included with highest priority (or in other words, is included with highest precedence) is that associated with LCID3, which has priority 5. Thus, according to some embodiments, the uplink resources allocated by means the DCI 700 referred to in the example of FIG. 9 may be associated with a priority level of 5.

Implicit Priority Indicator

The embodiments presented so far provide an explicit priority indicator in the DCI. In the following embodiments, an implicit indicator is inferred based on the uplink grant (e.g. from the DCI) or based on the communications resources themselves. For example, this can be an indicator that is used for other purposes but is now also used as a way to provide an indication of relative priority. Whilst explicit priority indicators are applicable for dynamic grant PUSCH, implicit indicators can be applied in both dynamic grant and configured grant PUSCH.

According to an example embodiment, the implicit indicator is inferred from a subcarrier spacing used by the granted PUSCH. This embodiment recognizes that each LCID is configured with a set of allowable subcarrier spacings, i.e. allowedSCS-List which determines the subcarrier spacing of the PUSCH that is allowed to carry the data of the LCID. Larger subcarrier spacing has a shorter OFDM symbol duration and here it is assumes that a shorter OFDM symbol duration is typically for transmission with low latency requirement. Therefore, in this embodiment, the PUSCH with larger subcarrier spacing has higher priority than one with lower subcarrier spacing. For example if DCI #1 schedules PUSCH #1 at 30 kHz whilst DCI #2 schedules PUSCH2 at 15 kHz, then PUSCH #1 with larger subcarrier spacing has higher priority than PUSCH #2.

In another example embodiment, the implicit indication for prioritising the communications resources can be inferred by the UE from a duration of the granted resources in the PUSCH. That is to say the duration of the granted resources is the time occupied by the granted resources in the PUSCH, which may be already indicated in the UL grant according to known communications systems (in the legacy Rel-15 NR). According to this example embodiment it is recognised that each LCID is configured with a max-PUSCH-Duration parameter which determines the longest PUSCH duration that data from the LCID can be multiplexed into the PUSCH's TB. Therefore, the PUSCH with the shorter duration has higher priority than one with longer duration. If DCI #1 schedules PUSCH #1 which is four OFDM symbols long whilst DCI #2 schedules PUSCH #2 which is one slot occupying fourteen OFDM symbols long, then PUSCH #1 has a higher priority than PUSCH #2 since the duration of PUSCH #1 is shorter than that of PUSCH #2. It should be appreciated that the overall duration of a PUSCH is also determined by the subcarrier spacing of the PUSCH. For example if DCI #1 schedules PUSCH #1 at 30 kHz which is four OFDM symbols long whilst DCI #2 schedules PUSCH #2 at 15 kHz which is four OFDM symbols long, although the number of OFDM symbols are the same, PUSCH #1 has higher priority because the duration of four OFDM symbols at 30 kHz is half the duration of four OFDM symbols at 15 kHz. However, if the duration and other parameters are same, then later grant can be prioritized in principle.

In another embodiment, the implicit indicator is inferred from the UE from the RNTI used by the DCI. For a dynamic grant PUSCH, the UE can be masked with two types of RNTI namely C-RNTI and MCS-C-RNTI where a DCI using MCS-C-RNTI uses a lower spectral efficiency MCS table in determining its UL grant. The lower spectral efficiency MCS table is used to provide higher reliability for the scheduled PUSCH. Hence, in this embodiment, PUSCH that is scheduled using DCI with MCS-C-RNTI has higher priority than a PUSCH that is scheduled using DCI with C-RNTI.

Figure 11:
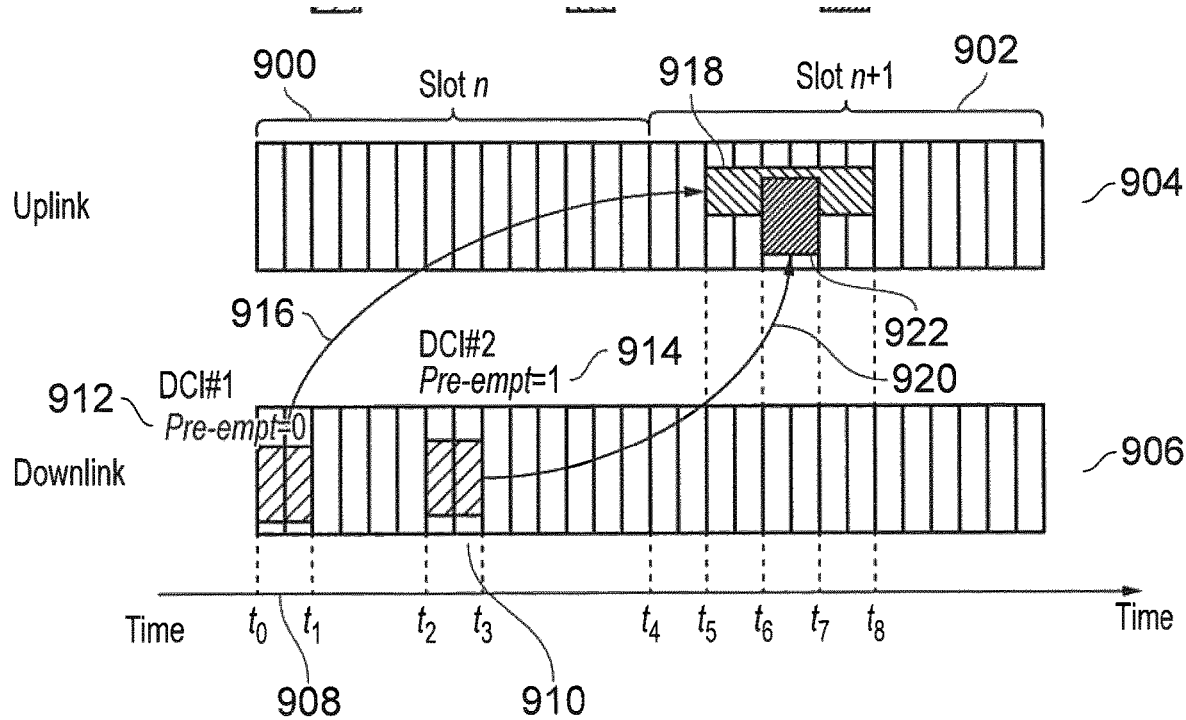
FIG. 11 graphical representation of a sequence of uplink and downlink transmissions in accordance with certain embodiments of the present disclosure.

According to one example embodiment illustrated in FIG. 11 a downlink message allocating uplink resources such as a DCI is used to carry a pre-emption indication allowing the transmission of one transport block to pre-empt another. An implementation is a 1 bit indicator that if set, means that the transmission of a TB in resource granted by that DCI can pre-empt the transmission of a TB granted by another DCI. As shown in FIG. 11 two time slots 900, 902 are showing for an UL part of a wireless access interface 904 and a DL part of the wireless access interface 906. In FIG. 11 each of the UL part and the DL part 904, 906, is made up of fourteen units comprising OFDM symbols. In the DL 906 between time t0 and t1 in the first two OFDM symbols a first DCI DCI #1 908 is transmitted. Between times t2 and t3 in two other OFDM symbols a second DCI DCI #2 is transmitted 910. The first DCI DCI #1 carries a single bit providing a pre-emption indicator zero 912. The second DCI DCI #2 carries the same bit but indicating the pre-emption indicator one 914. The first DCI DCI #1 provides an indication of UL grant of resources in the second timeslot 902 represented by an arrow 916 and a first box between time t5 and time t8 in a certain section of six OFDM symbols 918. The second DCI DCI #2 provides an indication of UL grant of resources in the second timeslot 902 represented by an arrow 920 and a second box 922 between time t6 and time t7 in a certain section of two OFDM symbols.

As will be appreciated from the arrangement shown in FIG. 11, there is an overlap in the granted UL resources provided by the first DCI DCI #1 for transmitting the first TB 918 and the granted UL resource provided by the second DCI DCI #2 provided for transmitting the second TB 922. However because second DCI DCI #2 included a pre-emption indicator=1 914, the transmission of the transport block associated with the second DCI DCI #2 pre-empts a transmission using at least a portion of the resources allocated by the first DCI DCI #1. According to the example embodiment provided in FIG. 11 therefore PUSCH #2 partially collides with PUSCH #1. The Pre-emption Indicator=1 in DCI #2 indicates to the UE that PUSCH #2 (scheduled by DCI #2) has higher priority than any previous PUSCH since it can pre-empt previous PUSCH. In this example the UE would stop PUSCH #1 transmissions either completely or partially (e.g. only the pre-empted parts) so that it can transmit PUSCH #2.

Further examples of resolving collisions between conflicting allocations of resource for different TB which would collide in time and/or frequency resources is given in the following paragraphs:

It should be appreciated that although this invention focused on case where the DCI of colliding PUSCHs uses the same format or size, the collision handling aspect is also applicable for the case where the priority is determined using different DCI format. Note that different DCI formats may have the same or different DCI sizes. For example the DCI scheduling an eMBB transmission uses a different format to a DCI scheduling a URLLC transmission and therefore the URLLC DCI format has higher priority than the eMBB DCI format.

Figure 12:
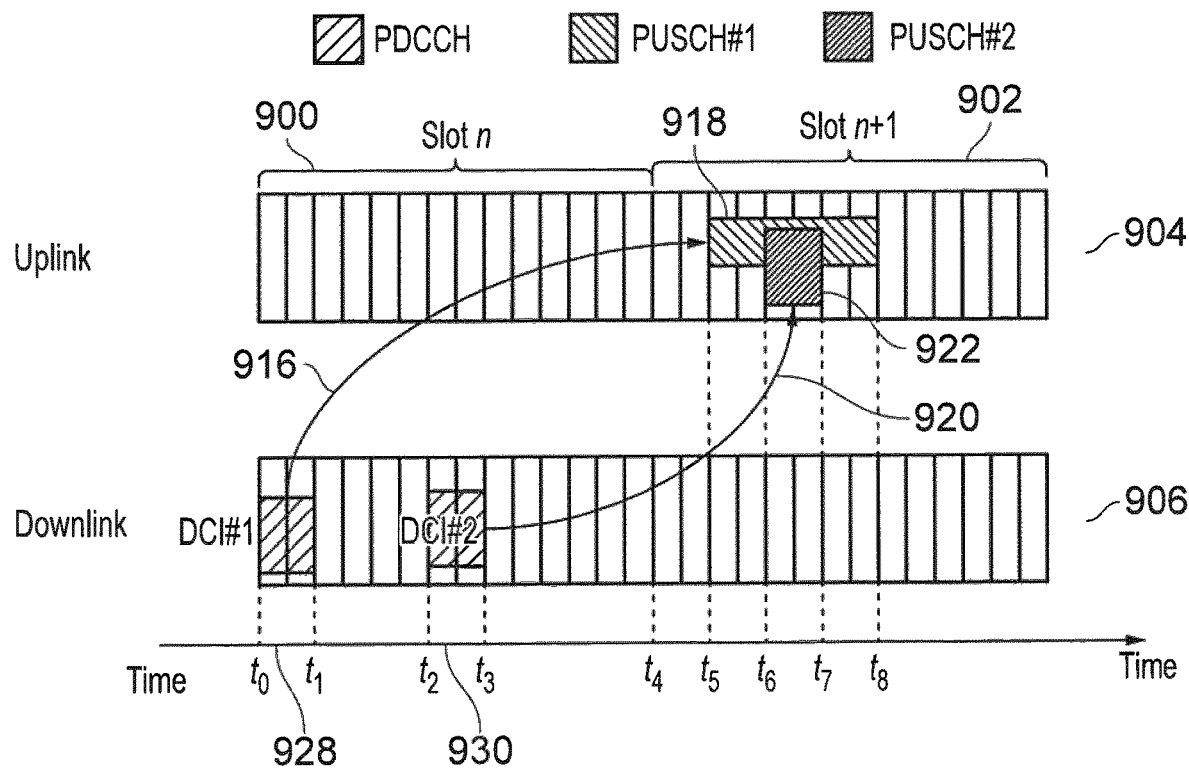
FIG. 12 is graphical representation of a sequence of uplink and downlink transmissions in accordance with certain embodiments of the present disclosure.

An example embodiment is shown in FIG. 12, which corresponds to the example shown in FIG. 11 and so only the differences will be described. FIG. 12 provides an example in which the first DCI DCI #1 and the second DCI DCI #2 do not carry a pre-emption indicator, but simply allocates the resources of the UL PUSCH 918, 922 which can be thought of as PUSCH #1 and PUSCH #2. As for the example shown in FIG. 11, the allocated resources of the PUSCH #1 and PUSCH #2 therefore collide partially in time and frequency. The embodiments are also applicable of PUSCH #1 and PUSCH #2 fully collides in time and frequency.

According to the example embodiment illustrated in FIG. 12, the UE is not directed to prioritise one transmission of a TB over another in PUSCH #1 and PUSCH #2 and so must infer a relative priority of transmission to resolve a potential conflict. When two or more PUSCH collides in time the UE firstly determines the priority of these PUSCH using one or more of the previous embodiments of the in respect of the prefer priority carried by the TB. According to this example the UE drops the lower priority PUSCH. For example in FIG. 12, if PUSCH #1 has lower priority than PUSCH #2, then the UE drops either partially (i.e. the colliding portions) or fully, PUSCH #1 thereby allowing PUSCH #2 to be transmitted. On the other hand if PUSCH #2 has a lower priority than PUSCH #1, then the UE would drop PUSCH #2 even though PUSCH #2 is scheduled by a later grant (i.e. DCI 2 transmitted after DCI 1).

In another embodiment, if two or more colliding PUSCHs have the same priority, then the PUSCH that is scheduled by the later UL grant has priority. In the example in FIG. 12, if PUSCH #1 and PUSCH #2 918, 922 have the same priority as determined using one or more of the previous embodiments, then PUSCH #2 922 has priority over PUSCH #1 918 since PUSCH #2 922 is scheduled by a later grant, i.e. DCI #2 930. In this example, the TB transmitted in PUSCH #1 918 is fully or partially dropped so that the TB can be transmitted in the PUSCH #2 922 is transmitted.

Figure 13:
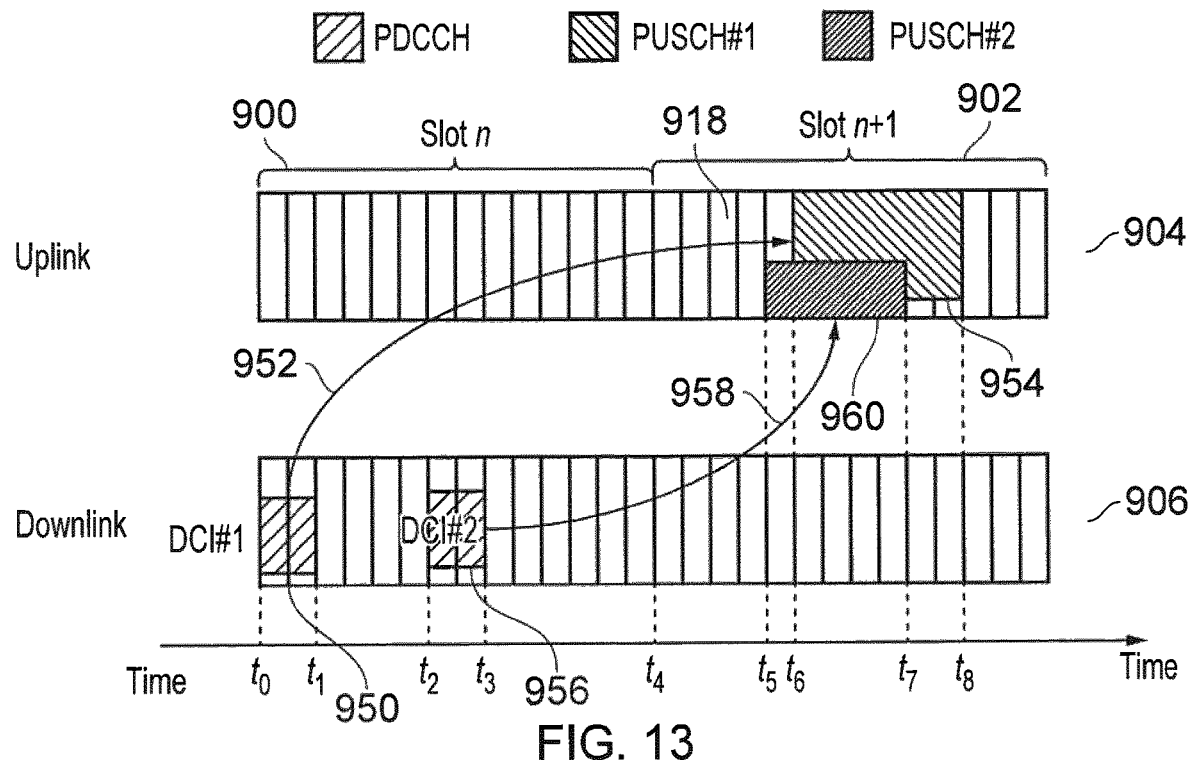
FIG. 13 is graphical representation of a sequence of uplink and downlink transmissions in accordance with certain embodiments of the present disclosure.

In another example embodiment, if two or more colliding PUSCHs have the same priority as determined using one or more of the previous embodiments, then the PUSCH that starts later has priority over the earlier PUSCH. An example is shown in FIG. 13, where again only the differences with respect to FIGS. 11 and 12 will be described for brevity. As shown FIG. 13, at time $t_0$, a first DCI DCI #1 950 schedules a TB for transmission in a first UL granted resources represent by an arrow 952 PUSCH #1 954 which starts at time $t_6$. At a later time $t_2$, a second DCI 956 DCI #2 schedules a TB for transmission in second UL granted resources represent by an arrow 958 PUSCH #2 960 that starts at time $t_6$. Although PUSCH #2 960 is scheduled by a later UL grant, i.e. DCI #2 956, PUSCH #1 954 transmission is scheduled to start later than that of PUSCH #2 960 and hence, PUSCH #1 954 has a higher priority than PUSCH #2 960. In this example, PUSCH #2 960 is stopped either partially or fully so that PUSCH #1 954 can be transmitted.

Figure 14:
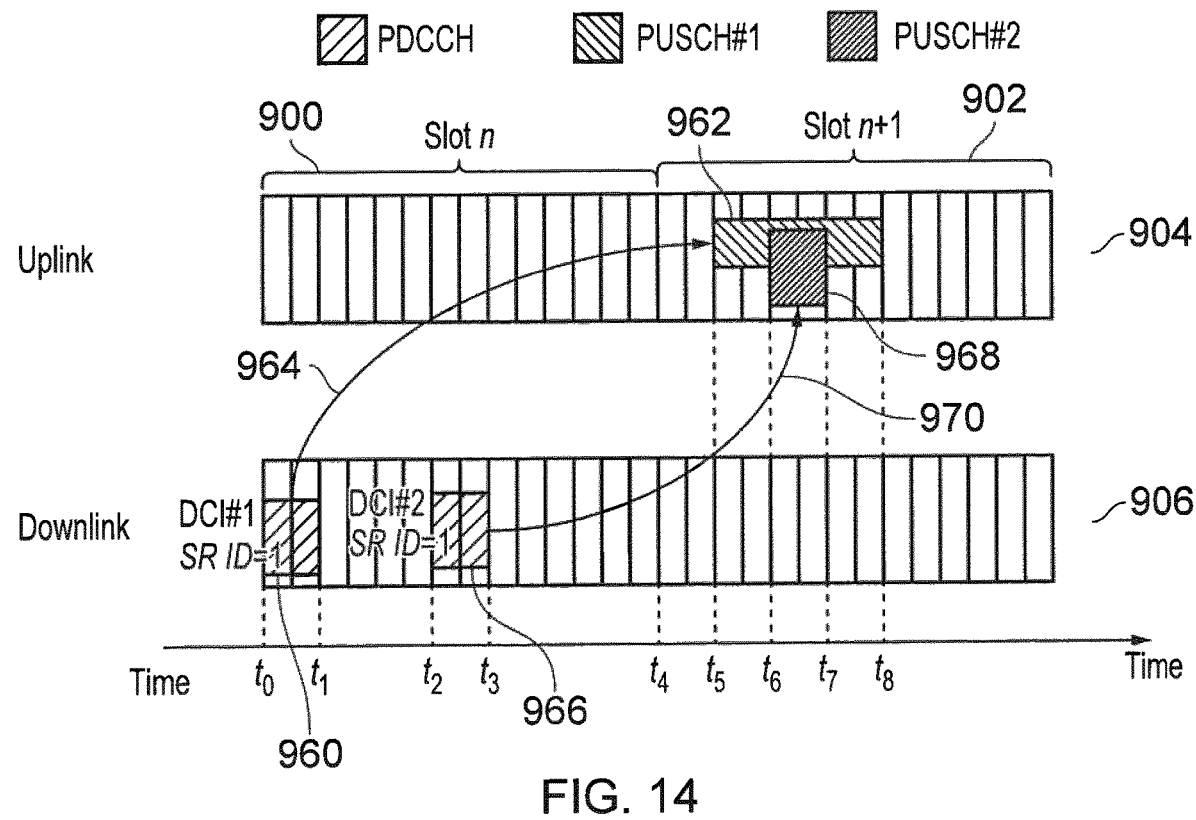
FIG. 14 is graphical representation of a sequence of uplink and downlink transmissions in accordance with certain embodiments of the present disclosure.

It should be appreciated that the example embodiments described herein can be used independently or combined together. In another example embodiment, a PUSCH priority is determined using an explicit priority indicator or implicit priority indicator. Here the UE first determines the PUSCHs' priority using an explicit priority indicator in the DCI and if the explicit indicator identifies that a plurality of PUSCHs have the same priority, the UE can then use an implicit indicator to resolve a conflict of resources. An example is shown in FIG. 14, which again corresponds to the example embodiments shown in FIGS. 11, 12 and 13 and so only the differences will be described. As shown in FIG. 14, a first DCI DCI #1 960 transmitted at time $t_0$ schedules transmission of a TB in PUSCH #1 962 as represented by an arrow 964. The UL granted resources PUSCH #1 962 has a duration of six OFDM symbols between time $t_5$ and $t_8$. At a later time $t_2$ a second DCI DCI #2 966 transmitted at time $t_2$ schedules the transmission of a TB in UL granted resources PUSCH #2 968 as represented by an arrow 970. The second UL resource granted by the second DCI #2 966 has a duration of two OFDM symbols between time $t_6$ and $t_7$. An explicit priority indicator using an SR ID as described in the embodiment described with reference to FIG. 10 is used in both the first and second DCIs 960, 966. For the example shown in FIG. 14, the first and second DCIs DCI #1 960 and DCI #2 966 refer to the same scheduling request indicator SR ID=1. That is to say, the explicit priority indicator determines that both PUSCH #1 and PUSCH #2 have the same priority. According to this example embodiment, an implicit indicator is therefore used and here the implemented implicit indicator is the duration of the allocated UL granted PUSCH resource. That is to say that the shorter PUSCH duration has a higher priority as explained for the embodiment explained above with reference to FIG. 12. Therefore, in this example, the PUSCH #2 968 is given a higher priority than PUSCH #1 962 since PUSCH #2 has a shorter duration than that of PUSCH #1. The UE then stops either partially or fully the transmission of PUSCH #1 so that PUSCH #2 can be transmitted.

In another embodiment, if both explicit and implicit priority indicators are used, then the UE will determine the priority using implicit indicator first followed by explicit indicator.

It should be appreciated that PUSCH collisions could be as a result of two dynamic grants or dynamic and configured grants where explicit and implicit priority indicators are conveyed to the UE as appropriate or known to the UE in advance.

Ln some embodiments, the priority of uplink allocated resources are compared in response to a determination that the communications resources collide. Based on the outcome of the comparison, the UE refrains from using some or all of the resources having the lower priority. In some embodiments, the priority of uplink allocated resources may be compared in response to some other determination, for example that the preparation and transmission of TBs using both resources is not feasible, for example due to processing capacity constraints of the UE.

In some embodiments, as described above, the inclusion of data associated with a logical channel may be subject to constraints on the maximum amount of data associated with a logical channel which can be included in a particular transport block, such as in accordance with a bucket algorithm. In some embodiments, no such constraints may apply, or different constraints may apply.

It should be appreciated that although the example embodiments have been described with reference to collisions of uplink communications resources, such as on PUSCH, some embodiments and aspects of the present disclosure described above may, in some embodiments, be applicable for collisions of communications resources which are allocated on a downlink channel (such as a PDSCH) for the transmission of data to a UE.

For example, in some embodiments, a relative priority of two colliding PDSCH resources may be based on an implicit indication based on a delay between a transmission of downlink data on the PDSCH and a corresponding HARQ acknowledgement transmitted on a PUCCH. The PDSCH carries the downlink data and the PUCCH can carry the HARQ acknowledgement for the downlink data transmitted on the PDSCH. The PUCCH communications resource where the HARQ acknowledgement is to be transmitted is indicated in a DCI associated with the PDSCH resource, e.g. whereby the DCI may indicate the intended recipient of the downlink data. The DCI may comprise an indication of a parameter PDSCH to PUCCH delay, K1, whereby if the PDSCH associated with the DCI ends in slot n, the PUCCH resources for transmitting the corresponding HARQ acknowledgement occur in slot n+K1. In this embodiment, PDSCH resources associated with a shorter delay, (i.e.

smaller K1 value) have higher priority than PDSCH resources associated with a longer delay (i.e. larger K1 value).

In another embodiment, the priority of a transport block transmitted on the PDSCH is indicated by the granularity of the parameter K1. According to 3GPP Release 15 specifications, the granularity of K1 is in units of slots, that is if K1=2, it means the delay is 2 slots. However, the indication of K1 may be based on a different unit, greater than or less than one slot. For example, an indication of K1 may comprise an indication of a number of units, each unit corresponding to 2 OFDM symbols. In such an example, if K1=2 units the delay is 4 OFDM symbols. The priority of a first PDSCH may be higher than that of a second PDSCH, if the parameter K1 associated with the first PDSCH is indicated in units of shorter duration than the parameter K1 associated with the second PDSCH resources. In other words, where a first instance of the parameter K1 is indicated with finer granularity than another instance of the parameter K1, the communications resources associated with the first instance have a higher priority than those associated with the other instance. Hence in an example, a PDSCH where K1 is indicated in units of single OFDM slots has higher priority than a PDSCH where K1 is indicated in units of 2 OFDM slots.

A UE which receives two DCIs may determine that they correspond to colliding PDSCH communications resources. In response, the UE may determine a priority for each PDSCH resource, for example using one of the techniques described above. In response to determining that one of the PDSCH resources are associated with a lower priority than the other, the UE may refrain from attempting to receive and/or decode the transmissions using some or all of the lower priority PDSCH resources. The selection of which PDSCH resources the UE attempts to receive and decode may be in accordance with one or more of the techniques which have been described above in the context of uplink communications resources on PUSCH having differing priorities, where instead of selecting which PUSCH resources the UE should transmit using, the UE selects the PDSCH resources to receive and/or decode.

Thus there has been described a method of transmitting data by a communications device in a wireless communications network, the method comprising receiving a first downlink control message comprising an indication of a first dynamic grant allocating first uplink communications resources for transmission of data by the communications device, receiving a second downlink control message, the second downlink control message comprising an indication of a second dynamic grant allocating second uplink communications resources for transmission of data by the communications device, determining that the second uplink communications resources comprise at least a portion of the first uplink communications resources, determining that the first uplink communications resources are associated with a higher priority than the second uplink communications resources, and in response to the determining that the first uplink communications resources are associated with a higher priority than the second uplink communications resources, transmitting a transport block using the first uplink communications resources.

There has also been described a method of transmitting data by a communications device in a wireless communications network, the method comprising receiving a data from each of a plurality of logical channels, each of the logical channels having an assigned relative priority, receiving a first downlink control message allocating first uplink communications resources of a wireless access interface for transmitting a transport block which is to carry the data from one or more of the plurality of logical channels, determining, based on the received first downlink control message, a priority for filling an available capacity of the transport block with the data from one or more of the plurality of logical channels, and transmitting the transport block in the allocated first uplink communications resources.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communication devices/IoT devices or other narrowband communications devices, but can be applied more generally, for example in respect of any type communications device operating with a wireless link to the communication network.

It will further be appreciated that the principles described herein are not applicable only to LTE-based wireless telecommunications systems, but are applicable for any type of wireless telecommunications system that supports a random access procedure comprising an exchange of random access procedure messages between a communications device and a base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of transmitting data by a communications device in a wireless communications network, the method comprising receiving a first downlink control message comprising an indication of a first dynamic grant allocating first uplink communications resources for transmission of data by the communications device, receiving a second downlink control message, the second downlink control message comprising an indication of a second dynamic grant allocating second uplink communications resources for transmission of data by the communications device, determining that the second uplink communications resources comprise at least a portion of the first uplink communications resources, determining that the first uplink communications resources are associated with a higher priority than the second uplink communications resources, and in response to the determining that the first uplink communications resources are associated with a higher priority than the second uplink communications resources, transmitting a transport block using the first uplink communications resources.

Paragraph 2. A method according to paragraph 1, wherein determining that the first uplink communications resources are associated with a higher priority than the second uplink communications resources comprises determining that the first control indication was received after the second control indication.

Paragraph 3. A method according to paragraph 1 or paragraph 2, wherein determining that the first uplink communications resources are associated with a higher priority than the second uplink communications resources comprises determining that the first uplink communications resources start after the second uplink communications resources Paragraph 4. A method according to any of paragraphs 1 to 3, wherein determining that the first uplink communications resources are associated with a higher priority than the second uplink communications resources comprises determining that a duration of the first uplink communications resources is greater than a duration of the second uplink communications resources.

Paragraph 5. A method according to any of paragraphs 1 to 4, wherein determining that the first uplink communications resources are associated with a higher priority than the second uplink communications resources comprises determining that a modulation and coding scheme to be used for the transmission of the data using the first uplink communications resources provides greater reliability than a modulation and coding scheme to be used for a transmission of data using the second uplink communications resources.

Paragraph 6. A method according to any of paragraphs 1 to 5, wherein the first uplink communications resources are associated with a first sub-carrier spacing, and the second uplink communications resources are associated with a second sub-carrier spacing, and determining that the first uplink communications resources are associated with a higher priority than the second uplink communications resources comprises determining that the first sub-carrier spacing is greater than the second sub-carrier spacing.

Paragraph 7. A method according to any of paragraphs 1 to 6, wherein determining that the first uplink communications resources are associated with a higher priority than the second uplink communications resources comprises determining that the first downlink control message comprises an indication that pre-emption of communication resources allocated by a downlink control message received before the first downlink control message, by transmitting the transport block using the first uplink communication resources, is permitted and that the second downlink control message was received before the first downlink control message was received and comprises an indication that pre-emption is not permitted.

Paragraph 8. A method according to any of paragraphs 1 to 7, wherein the first downlink control message comprises an indication of the priority associated with the first uplink communications resources, and the second downlink control message comprises an indication of the priority associated with the second uplink communications resources.

Paragraph 9. A method according to paragraph 8, wherein the indication of the priority associated with the first uplink communications resources comprises an indication of a first logical channel, the first logical channel being associated with a first logical channel priority, and the indication of the priority associated with the second uplink communications resources comprises an indication of a second logical channel, the second logical channel being associated with a second logical channel priority, and determining that the first uplink communications resources are associated with a higher priority than the second uplink communications resources comprises determining that the first logical channel priority is higher than the second logical channel priority.

Paragraph 10. A method according to paragraph 8, wherein the indication of the priority associated with the first uplink communications resources comprises an indication of a priority value for the first uplink communication resources, the indication of the priority associated with the second uplink communications resources comprises an indication of a priority value for the second uplink communication resources, and determining that the first uplink communications resources are associated with a higher priority than the second uplink communications resources comprises determining that the priority value of the first uplink communication resources is higher than the priority value of the second uplink communication resources.

Paragraph 11. A method according to paragraph 8, wherein the indication of the priority associated with the first uplink communications resources comprises an indication of a first group of one or more logical channels, the indication of the priority associated with the second uplink communications resources comprises an indication of a second group of one or more logical channels, each of the one or more logical channels being associated with a logical channel priority, and determining that the first uplink communications resources are associated with a higher priority than the second uplink communications resources comprises determining that the highest logical channel priority associated with any of the first group of one or more logical channels is greater than the highest logical channel priority associated with any of the second group of one or more logical channels.

Paragraph 12. A method according to paragraph 11, wherein a first scheduling request, SR, identity is associated with first control channel communications resources for transmitting a scheduling request requesting an allocation of communications resources for transmitting data associated with one or more of the first group of logical channels, a second SR identity is associated with second control channel communications resources for transmitting a scheduling request requesting an allocation of communications resources for transmitting data associated with one or more of the second group of logical channels, the indication of the first group of one or more logical channels comprises an indication of the first SR identity, and the indication of the second group of one or more logical channels comprises an indication of the second SR identity.

Paragraph 13. A method according to paragraph 11, wherein a first logical channel group, LCG, identity is associated with the first group of logical channels, a buffer status corresponding to each of the first group of logical channels being reported within a single buffer status report, a second SR identity is associated with a second LCG identity is associated with the second group of logical channels, a buffer status corresponding to each of the second group of logical channels being reported within a single buffer status report, the indication of the first group of one or more logical channels comprises an indication of the first LCG identity, and the indication of the second group of one or more logical channels comprises an indication of the second LCG identity.

Paragraph 14. A method according to any of paragraphs 1 to 13, the method comprising forming a second transport block comprising second data, and transmitting the second transport block using a portion of the second uplink communications resources, the portion of the second uplink communications resources not including any of the first uplink communications resources.

Paragraph 15. A method according to any of paragraphs 1 to 14, wherein the first uplink communications resources are on a physical uplink shared channel.

Paragraph 16. A method according to any of paragraphs 1 to 15, the method comprising receiving data associated with each of a plurality of logical channels, and determining, based on the first downlink control message, a priority for filling an available capacity of the transport block with the data from one or more of the plurality of logical channels.

Paragraph 17. A method according to paragraph 16, wherein the first downlink control message comprises an indication of one or more logical channels, and the priority for filling the available capacity of the transport block is based on the indication of the one or more logical channels.

Paragraph 18. A method according to paragraph 17, wherein the indication of the one or more logical channels comprises one of an SR identity, an LCG identity and a logical channel identity.

Paragraph 19. A method of transmitting data by a communications device in a wireless communications network, the method comprising receiving a data from each of a plurality of logical channels, each of the logical channels having an assigned relative priority, receiving a first downlink control message allocating first uplink communications resources of a wireless access interface for transmitting a transport block which is to carry the data from one or more of the plurality of logical channels, determining, based on the received first downlink control message, a priority for filling an available capacity of the transport block with the data from one or more of the plurality of logical channels, and transmitting the transport block in the allocated first uplink communications resources.

Paragraph 20. A method according to any of paragraphs 1 to 19, the method comprising before receiving the first downlink control message, transmitting one of a scheduling request and a buffer status report, the one of the scheduling request and the buffer status report requesting an allocation of uplink communications resources for the transmission of data.

Paragraph 21. A method of receiving data by an infrastructure equipment in a wireless communications network, the method comprising transmitting a first downlink control message comprising an indication of a first dynamic grant allocating first uplink communications resources for transmission of data by a communications device, transmitting a second downlink control message, the second downlink control message comprising an indication of a second dynamic grant allocating second uplink communications resources for transmission of data by the communications device, and receiving a transport block using the first uplink communications resources, wherein the second uplink communications resources comprise at least a portion of the first uplink communications resources, and the first uplink communications resources are associated with a higher priority than the second uplink communications resources.

Paragraph 22. A method of receiving data by an infrastructure equipment in a wireless communications network, the method comprising transmitting a first downlink control message allocating uplink communications resources of a wireless access interface for transmitting a transport block, the first downlink control message providing an indication of a priority for filling an available capacity of the transport block with data from one or more of a plurality of logical channels, each of the logical channels having an assigned relative priority, and receiving the transport block in the allocated first uplink communications resources.

Paragraph 23. A method according to paragraph 22, the method comprising determining the priority for filling an available capacity of the transport block with data from one or more of a plurality of logical channels.

Paragraph 24. A method according to any of paragraphs 21 to 23, the method comprising receiving one of a scheduling request and a buffer status report, the one of the scheduling request and the buffer status report requesting an allocation of uplink communications resources for the transmission of data, wherein the first downlink control message is transmitted in response to the receiving the one of the scheduling request and the buffer status report.

Paragraph 25. A communications device for use in a wireless communications network, the wireless communications network comprising an infrastructure equipment providing a wireless access interface, the communications device comprising a transmitter configured to transmit data via the wireless access interface, a receiver configured to receive signals, and a controller configured to control the transmitter and the receiver so that the communications device is operable: to receive a first downlink control message comprising an indication of a first dynamic grant allocating first uplink communications resources for transmission of data by the communications device, to receive a second downlink control message, the second downlink control message comprising an indication of a second dynamic grant allocating second uplink communications resources for transmission of data by the communications device, to determine that the second uplink communications resources comprise at least a portion of the first uplink communications resources, to determine that the first uplink communications resources are associated with a higher priority than the second uplink communications resources, and in response to determining that the first uplink communications resources are associated with a higher priority than the second uplink communications resources, to transmit a transport block using the first uplink communications resources.

Paragraph 26. Circuitry for a communications device for use in a wireless communications network, the wireless communications network comprising an infrastructure equipment providing a wireless access interface, the circuitry comprising transmitter circuitry configured to transmit data via the wireless access interface, receiver circuitry configured to receive signals, and controller circuitry configured to control the transmitter circuitry and the receiver circuitry so that the communications device is operable: to receive a first downlink control message comprising an indication of a first dynamic grant allocating first uplink communications resources for transmission of data by the communications device, to receive a second downlink control message, the second downlink control message comprising an indication of a second dynamic grant allocating second uplink communications resources for transmission of data by the communications device, to determine that the second uplink communications resources comprise at least a portion of the first uplink communications resources, to determine that the first uplink communications resources are associated with a higher priority than the second uplink communications resources, and in response to determining that the first uplink communications resources are associated with a higher priority than the second uplink communications resources, to transmit a transport block using the first uplink communications resources.

Paragraph 27. A communications device for use in a wireless communications network, the wireless communications network comprising an infrastructure equipment providing a wireless access interface, the communications device comprising a transmitter configured to transmit data via the wireless access interface, a receiver configured to receive signals, and a controller configured to control the transmitter and the receiver so that the communications device is operable: to receive a data from each of a plurality of logical channels, each of the logical channels having an assigned relative priority, to receive a first downlink control message allocating first uplink communications resources of a wireless access interface for transmitting a transport block which is to carry the data from one or more of the plurality of logical channels, to determine, based on the received first downlink control message, a priority for filling an available capacity of the transport block with the data from one or more of the plurality of logical channels, and to transmit the transport block in the allocated first uplink communications resources.

Paragraph 28. Circuitry for a communications device for use in a wireless communications network, the wireless communications network comprising an infrastructure equipment providing a wireless access interface, the circuitry comprising transmitter circuitry configured to transmit data via the wireless access interface, receiver circuitry configured to receive signals, and controller circuitry configured to control the transmitter circuitry and the receiver circuitry so that the communications device is operable: to receive a data from each of a plurality of logical channels, each of the logical channels having an assigned relative priority, to receive a first downlink control message allocating first uplink communications resources of a wireless access interface for transmitting a transport block which is to carry the data from one or more of the plurality of logical channels, to determine, based on the received first downlink control message, a priority for filling an available capacity of the transport block with the data from one or more of the plurality of logical channels, and to transmit the transport block in the allocated first uplink communications resources.

Paragraph 29. Infrastructure equipment for use in a wireless communications network, the infrastructure equipment providing a wireless access interface, the infrastructure equipment comprising a transmitter configured to transmit signals to a communications device via the wireless access interface in a cell, a receiver configured to receive data from the communications device, and a controller, configured to control the transmitter and the receiver so that the infrastructure equipment is operable: to transmit a first downlink control message comprising an indication of a first dynamic grant allocating first uplink communications resources for transmission of data by the communications device, to transmit a second downlink control message, the second downlink control message comprising an indication of a second dynamic grant allocating second uplink communications resources for transmission of data by the communications device, and to receive a transport block using the first uplink communications resources, wherein the second uplink communications resources comprise at least a portion of the first uplink communications resources, and the first uplink communications resources are associated with a higher priority than the second uplink communications resources.

Paragraph 30. Circuitry for an infrastructure equipment for use in a wireless communications network, the infrastructure equipment providing a wireless access interface, the circuitry comprising transmitter circuitry configured to transmit signals to a communications device via the wireless access interface in a cell, receiver circuitry configured to receive data from the communications device, and controller circuitry, configured to control the transmitter circuitry and the receiver circuitry so that the infrastructure equipment is operable: to transmit a first downlink control message comprising an indication of a first dynamic grant allocating first uplink communications resources for transmission of data by the communications device, to transmit a second downlink control message, the second downlink control message comprising an indication of a second dynamic grant allocating second uplink communications resources for transmission of data by the communications device, and to receive a transport block using the first uplink communications resources, wherein the second uplink communications resources comprise at least a portion of the first uplink communications resources, and the first uplink communications resources are associated with a higher priority than the second uplink communications resources.

Paragraph 31. Infrastructure equipment for use in a wireless communications network, the infrastructure equipment providing a wireless access interface, the infrastructure equipment comprising a transmitter configured to transmit signals to a communications device via the wireless access interface in a cell, a receiver configured to receive data from the communications device, and a controller, configured to control the transmitter and the receiver so that the infrastructure equipment is operable: to transmit a first downlink control message allocating uplink communications resources of a wireless access interface for transmitting a transport block, the first downlink control message providing an indication of a priority for filling an available capacity of the transport block with data from one or more of a plurality of logical channels, each of the logical channels having an assigned relative priority, and to receive the transport block in the allocated first uplink communications resources.

Paragraph 32. Circuitry for an infrastructure equipment for use in a wireless communications network, the infrastructure equipment providing a wireless access interface, the circuitry comprising transmitter circuitry configured to transmit signals to a communications device via the wireless access interface in a cell, receiver circuitry configured to receive data from the communications device, and controller circuitry, configured to control the transmitter circuitry and the receiver circuitry so that the infrastructure equipment is operable: to transmit a first downlink control message allocating uplink communications resources of a wireless access interface for transmitting a transport block, the first downlink control message providing an indication of a priority for filling an available capacity of the transport block with data from one or more of a plurality of logical channels, each of the logical channels having an assigned relative priority, and to receive the transport block in the allocated first uplink communications resources.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-182090, "Revised SID: Study on NR Industrial Internet of Things (IoT)," RAN #81.
[2] TS38.321, "Medium Access Control (MAC) protocol specification (Rel-15)", v15.3.0
[3] R2-1818795, "LS on Intra-UE Prioritization/Multiplexing," RAN2, RAN2 #104
[4] Co-pending European patent application EP 18214944.3
[5] Co-pending European patent application EP 18185553.7
[6] RP-182089, "New SID on Physical Layer Enhancements for NR Ultra-Reliable and Low Latency Communication (URLLC)," RAN #81.
[7] TR38.824, "Study on physical layer enhancements for NR ultra-reliable and low latency case (URLLC) (Rel-16)," v1.0.0
[8] 3GPP TS 38.300 v. 15.2.0 "NR; NR and NG-RAN Overall Description; Stage 2(Release 15)", June 2018
[9] Holma H. and Toskala A, "LTE for UMTS OFDMA and SC-FDMA based radio access", John Wiley and Sons, 2009

Annex 1
LTE Wireless Access Interface

Embodiments of the present technique are not limited to a particular wireless communications standard, but find general application with a mobile communications system in which a transmitter and a receiver are configured to communicate data in units, transport blocks or packets for which some indication of feedback is provided as part of an ARQ type protocol. However, the following example embodiments will be explained with reference to a 3GPP defined LTE architecture. Those acquainted with LTE will appreciate that a wireless access interface configured in accordance with an LTE standard uses an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIGS. 15 and 16.

FIG. 15 provides a simplified schematic diagram of the structure of a downlink of a wireless access interface that may be provided by or in association with the eNB of FIG. 1 when the communications system is operating in accordance with the LTE standard. In LTE systems the wireless access interface of the downlink from an eNB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used to carry reference information used for channel estimation at the receiver for example) whilst some at the edge of the band are not used at all. For LTE, the number of subcarriers varies between 72 subcarriers (1.4 MHz) and 1200 subcarriers (20 MHz), but it will be appreciated that for other wireless access interfaces, such as NR or 5G, the number of sub-carriers and the bandwidth may be different. In some examples the subcarriers are grouped on a basis of 2n, for example 128 to 2048, so that both a transmitter and a receiver can use an inverse and a forward Fast Fourier Transform to convert the sub-carriers from the frequency domain to the time domain and from the time domain to the frequency domain respectively. Each subcarrier bandwidth may take any value but in LTE it is fixed at 15 kHz.

As shown in FIG. 15, the resources of the wireless access interface are also temporally divided into frames where a frame 200 lasts 10 ms and is subdivided into 10 sub-frames 1201 each with a duration of 1 ms. Each sub-frame 201 is formed from 14 OFDM symbols and is divided into two slots 1220, 1222 each of which comprise six or seven OFDM symbols depending on whether a normal or extended cyclic prefix is being utilised within OFDM symbols for the reduction of inter symbol interference. The resources within a slot may be divided into resources blocks 1203 each comprising 12 subcarriers for the duration of one slot and the resource blocks are further divided into resource elements 1204 which span one subcarrier for one OFDM symbol, where each rectangle 1204 represents a resource element. The resource elements distributed in time within a sub-frame and frequency across the host system bandwidth represent the communications resources of the host system.

The simplified structure of the downlink of an LTE wireless access interface presented in FIG. 16, also includes an illustration of each sub-frame 1201, which comprises a control region 1205 for the transmission of control data, a data region 1206 for the transmission of user data and reference signals 207 which are interspersed in the control and data regions in accordance with a predetermined pattern. The control region 1205 may contain a number of physical channels for the transmission of control data, such as a physical downlink control channel (PDCCH), a physical control format indicator channel (PCFICH) and a physical HARQ indicator channel (PHICH). The data region may contain a number of physical channels for the transmission of data or control, such as a physical downlink shared channel (PDSCH), enhanced physical downlink control channel (ePDCCH) and a physical broadcast channel (PBCH). Although these physical channels provide a wide range of functionality to LTE systems, in terms of resource allocation and the present disclosure, PDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it had previously requested or data which is being pushed to it by the eNodeB, such as radio resource control (RRC) signalling. In FIG. 16, UE1 has been allocated resources 1208 of the data region 1206, UE2 resources 1209 and UE3 resources 1210. UEs in an LTE system may be allocated a fraction of the available resources for the PDSCH and therefore UEs are required to be informed of the location of their allocated resources within the PDCSH so that only relevant data within the PDSCH is detected and estimated. In order to inform the UEs of the location of their allocated communications resource elements, resource control information specifying downlink resource allocations is conveyed across the PDCCH in a form termed downlink control information (DCI), where resource allocations for a PDSCH are communicated in a preceding PDCCH instance in the same sub-frame.

FIG. 15 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations sub-frames switch between uplink and downlink sub-frames in accordance with predefined patterns. However, regardless of the form of duplexing used, a common uplink frame structure is utilised. The simplified structure of FIG. 17 illustrates such an uplink frame in an FDD implementation. A frame 1300 is divided into 10 sub-frames 1301 of 1 ms duration where each sub-frame 1301 comprises two slots 1302 of 0.5 ms duration. Each slot 1302 is then formed from seven OFDM symbols 1303 where a cyclic prefix 1304 is inserted between each symbol in a manner equivalent to that in downlink sub-frames.

As shown in FIG. 15, each LTE uplink sub-frame may include a plurality of different channels, for example a physical uplink communications channel (PUSCH) 1305, a physical uplink control channel (PUCCH) 1306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink sub-frames may also include reference signals. For example, demodulation reference signals (DMRS) 1307 and sounding reference signals (SRS) 1308 may be present in an uplink sub-frame where the DMRS occupy the fourth symbol of a slot in which PUSCH is transmitted and are used for decoding of PUCCH and PUSCH data, and where SRS are used for uplink channel estimation at the eNodeB. The ePDCCH channel carries similar control information (DCI) as the PDCCH, but the physical aspects of PDCCH are different to those of ePDCCH, as discussed elsewhere herein. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink sub-frames, uplink sub-frames have a different control structure to downlink sub-frames, in particular the upper 1309 and lower 1310 subcarriers/frequencies/resource blocks of an uplink sub-frame are reserved for control signalling rather than the initial symbols of a downlink sub-frame. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulated in combination and therefore if efficient use of the available resources are to be made, contiguous frequency allocations for each UE may be preferable.

What is claimed is:

1. A method of transmitting data by a communications device in a wireless communications network, the method comprising:
receiving a first downlink control message comprising an indication of a first dynamic grant allocating first uplink communications resources for transmission of data by the communications device,
receiving a second downlink control message, the second downlink control message comprising an indication of a second dynamic grant allocating second uplink communications resources for transmission of data by the communications device,
determining that the second uplink communications resources comprise at least a portion of the first uplink communications resources,
determining that the first uplink communications resources are associated with a higher priority than the second uplink communications resources based on an indication included in the first downlink control message permitting pre-emption of the second uplink communications resources allocated by the second downlink control message received prior to the first downlink control message, and
in response to the determining that the first uplink communications resources are associated with a higher priority than the second uplink communications resources, transmitting a transport block using the first uplink communications resources.

2. The method according to claim 1, wherein determining that the first uplink communications resources are associated with a higher priority than the second uplink communications resources further comprises determining that the first control indication was received after the second control indication.

3. The method according to claim 1, wherein determining that the first uplink communications resources are associated with a higher priority than the second uplink communications resources further comprises determining that the first uplink communications resources start after the second uplink communications resources.

4. The method according to claim 1, wherein determining that the first uplink communications resources are associated with a higher priority than the second uplink communications resources further comprises determining that a duration of the first uplink communications resources is greater than a duration of the second uplink communications resources.

5. The method according to claim 1, wherein determining that the first uplink communications resources are associated with a higher priority than the second uplink communications resources further comprises determining that a modulation and coding scheme to be used for the transmission of the data using the first uplink communications resources provides greater reliability than a modulation and coding scheme to be used for a transmission of data using the second uplink communications resources.

6. The method according to claim 1, wherein the first uplink communications resources are associated with a first sub-carrier spacing, and the second uplink communications resources are associated with a second sub-carrier spacing, and
determining that the first uplink communications resources are associated with a higher priority than the second uplink communications resources further comprises determining that the first sub-carrier spacing is greater than the second sub-carrier spacing.

7. The method according to claim 1, wherein determining that the first uplink communications resources are associated with a higher priority than the second uplink communications resources comprises determining
that the second downlink control message was received before the first downlink control message was received and comprises an indication that pre-emption is not permitted.

8. The method according to claim 1, wherein
the first downlink control message comprises an indication of the priority associated with the first uplink communications resources, and
the second downlink control message comprises an indication of the priority associated with the second uplink communications resources.

9. The method according to claim 8, wherein the indication of the priority associated with the first uplink communications resources comprises an indication of a first logical channel, the first logical channel being associated with a first logical channel priority, and
the indication of the priority associated with the second uplink communications resources comprises an indication of a second logical channel, the second logical channel being associated with a second logical channel priority, and
determining that the first uplink communications resources are associated with a higher priority than the second uplink communications resources further comprises determining that the first logical channel priority is higher than the second logical channel priority.

10. The method according to claim 8, wherein the indication of the priority associated with the first uplink communications resources comprises an indication of a priority value for the first uplink communication resources,
the indication of the priority associated with the second uplink communications resources comprises an indication of a priority value for the second uplink communication resources, and
determining that the first uplink communications resources are associated with a higher priority than the second uplink communications resources further comprises determining that the priority value of the first uplink communication resources is higher than the priority value of the second uplink communication resources.

11. The method according to claim 8, wherein the indication of the priority associated with the first uplink communications resources comprises an indication of a first group of one or more logical channels,
the indication of the priority associated with the second uplink communications resources comprises an indication of a second group of one or more logical channels,
each of the one or more logical channels being associated with a logical channel priority, and
determining that the first uplink communications resources are associated with a higher priority than the second uplink communications resources further comprises determining that the highest logical channel priority associated with any of the first group of one or more logical channels is greater than the highest logical channel priority associated with any of the second group of one or more logical channels.

12. The method according to claim 11, wherein a first scheduling request (SR) identity is associated with first control channel communications resources for transmitting a scheduling request requesting an allocation of communications resources for transmitting data associated with one or more of the first group of logical channels,
a second SR identity is associated with second control channel communications resources for transmitting a scheduling request requesting an allocation of communications resources for transmitting data associated with one or more of the second group of logical channels, the indication of the first group of one or more logical channels comprises an indication of the first SR identity, and the indication of the second group of one or more logical channels comprises an indication of the second SR identity.

13. The method according to claim 11, wherein a first logical channel group (LCG) identity is associated with the first group of logical channels, a buffer status corresponding to each of the first group of logical channels being reported within a single buffer status report, a second SR identity is associated with a second LCG identity is associated with the second group of logical channels, a buffer status corresponding to each of the second group of logical channels being reported within a single buffer status report, the indication of the first group of one or more logical channels comprises an indication of the first LCG identity, and the indication of the second group of one or more logical channels comprises an indication of the second LCG identity.

14. The method according to claim 1, the method comprising forming a second transport block comprising second data, and transmitting the second transport block using a portion of the second uplink communications resources, the portion of the second uplink communications resources not including any of the first uplink communications resources.

15. The method according to claim 1, wherein the first uplink communications resources are on a physical uplink shared channel.

16. The method according to claim 1, the method comprising receiving data associated with each of a plurality of logical channels, and determining, based on the first downlink control message, a priority for filling an available capacity of the transport block with the data from one or more of the plurality of logical channels.

17. The method according to claim 16, wherein the first downlink control message comprises an indication of one or more logical channels, and the priority for filling the available capacity of the transport block is based on the indication of the one or more logical channels.

18. The method according to claim 17, wherein the indication of the one or more logical channels comprises one of an SR identity, an LCG identity and a logical channel identity.

19. A method of receiving data by an infrastructure equipment in a wireless communications network, the method comprising:

transmitting a first downlink control message comprising an indication of a first dynamic grant allocating first uplink communications resources for transmission of data by a communications device, transmitting a second downlink control message, the second downlink control message comprising an indication of a second dynamic grant allocating second uplink communications resources for transmission of data by the communications device, and receiving a transport block using the first uplink communications resources based on determination that the second uplink communications resources comprise at least a portion of the first uplink communications resources, wherein the first uplink communications resources are associated with a higher priority than the second uplink communications resources as determined based on based on an indication included in the first downlink control message permitting pre-emption of the second uplink communications resources allocated by the second downlink control message received prior to the first downlink control message.

* * * * *